US011842698B2

(12) United States Patent
Harada et al.

(10) Patent No.: US 11,842,698 B2
(45) Date of Patent: Dec. 12, 2023

(54) DISPLAY DEVICE

(71) Applicant: Japan Display Inc., Tokyo (JP)

(72) Inventors: Tsutomu Harada, Tokyo (JP); Tomoyuki Ishihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/960,261

(22) Filed: Oct. 5, 2022

(65) Prior Publication Data

US 2023/0114708 A1     Apr. 13, 2023

(30) Foreign Application Priority Data

Oct. 8, 2021   (JP) ................................. 2021-166387

(51) Int. Cl.
| | | |
|---|---|---|
| *G09G 3/34* | (2006.01) | |
| *G06F 3/01* | (2006.01) | |
| *G09G 3/36* | (2006.01) | |

(52) U.S. Cl.
CPC ........... *G09G 3/3406* (2013.01); *G06F 3/012* (2013.01); *G06F 3/013* (2013.01); *G09G 3/36* (2013.01); *G09G 2320/028* (2013.01); *G09G 2320/0276* (2013.01); *G09G 2320/066* (2013.01); *G09G 2354/00* (2013.01)

(58) Field of Classification Search
CPC .................. G09G 3/3406; G09G 3/36; G09G 2320/0276; G09G 2320/028; G09G 2320/066; G09G 2354/00; G06F 3/012; G06F 3/013
See application file for complete search history.

(56) References Cited

U.S. PATENT DOCUMENTS

| | | | | |
|---|---|---|---|---|
| 11,348,545 | B2 * | 5/2022 | Kimura | ................. G02F 1/1347 |
| 11,545,101 | B2 * | 1/2023 | Tomizawa | ........... G09G 3/3406 |
| 2004/0066363 | A1 * | 4/2004 | Yamano | .................... G09G 3/20 |
| | | | | 345/98 |
| 2004/0095558 | A1 * | 5/2004 | Whitehead | ............... H04N 9/31 |
| | | | | 353/30 |
| 2005/0184952 | A1 * | 8/2005 | Konno | ................. G09G 3/3648 |
| | | | | 345/102 |
| 2005/0248520 | A1 * | 11/2005 | Feng | .................... G09G 3/3426 |
| | | | | 345/87 |

(Continued)

FOREIGN PATENT DOCUMENTS

WO     WO2019/225137 A1     11/2019

*Primary Examiner* — Benyam Ketema

(74) *Attorney, Agent, or Firm* — K&L Gates LLP

(57) ABSTRACT

According to an aspect, a display device includes: a first panel; a second panel disposed opposing one surface of the first panel; a light source configured to emit light to the other surface of the first panel; and an acquirer configured to acquire user information including information indicating at least one of a position of an eye and a position of a head of a user facing the second panel. The first panel includes light control pixels. The second panel includes pixels. Blurring processing is applied by which the light control pixel positioned around a pixel controlled to transmit light in accordance with an input image signal is caused to transmit light. A blurring area including the light control pixel to which the blurring processing is applied on the first panel corresponds to the position of the eye of the user or the position of the head of the user.

10 Claims, 14 Drawing Sheets

(56) References Cited

U.S. PATENT DOCUMENTS

| | | | |
|---|---|---|---|
| 2007/0242028 A1* | 10/2007 | Kitagawa | G02F 1/133504 345/100 |
| 2011/0215991 A1* | 9/2011 | Nakazaki | G02F 1/13471 345/4 |
| 2012/0038693 A1* | 2/2012 | Kang | H04N 9/3117 353/31 |
| 2016/0170702 A1* | 6/2016 | Jiang | G06T 5/00 438/30 |
| 2016/0180782 A1* | 6/2016 | Nakaya | G09G 3/3648 345/88 |
| 2016/0379575 A1* | 12/2016 | Kawai | G09G 3/3611 345/694 |
| 2017/0343839 A1* | 11/2017 | Nam | G02F 1/13471 |
| 2019/0027101 A1* | 1/2019 | Lin | G09G 3/3607 |
| 2019/0139500 A1* | 5/2019 | Tada | G09G 3/3406 |
| 2019/0228689 A1* | 7/2019 | Tokuchi | G09G 3/002 |
| 2019/0259342 A1* | 8/2019 | Tada | G09G 3/36 |
| 2020/0193926 A1* | 6/2020 | Koudo | G09G 3/3607 |
| 2021/0035511 A1* | 2/2021 | Kimura | G09G 3/36 |
| 2021/0225331 A1* | 7/2021 | Park | G06F 3/041 |
| 2021/0358181 A1* | 11/2021 | Suzuki | G09G 5/377 |
| 2022/0375377 A1* | 11/2022 | Ishihara | G09G 3/3607 |
| 2022/0392418 A1* | 12/2022 | Tomizawa | G09G 3/3611 |
| 2023/0029822 A1* | 2/2023 | Ogawa | G06F 18/20 |
| 2023/0066869 A1* | 3/2023 | Kim | G06V 10/40 |

* cited by examiner

FIG.2
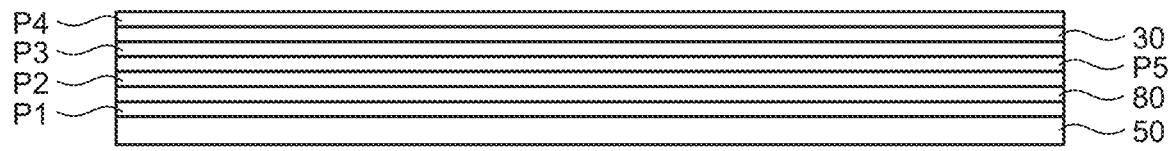
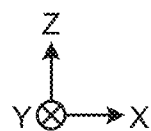
FIG.3
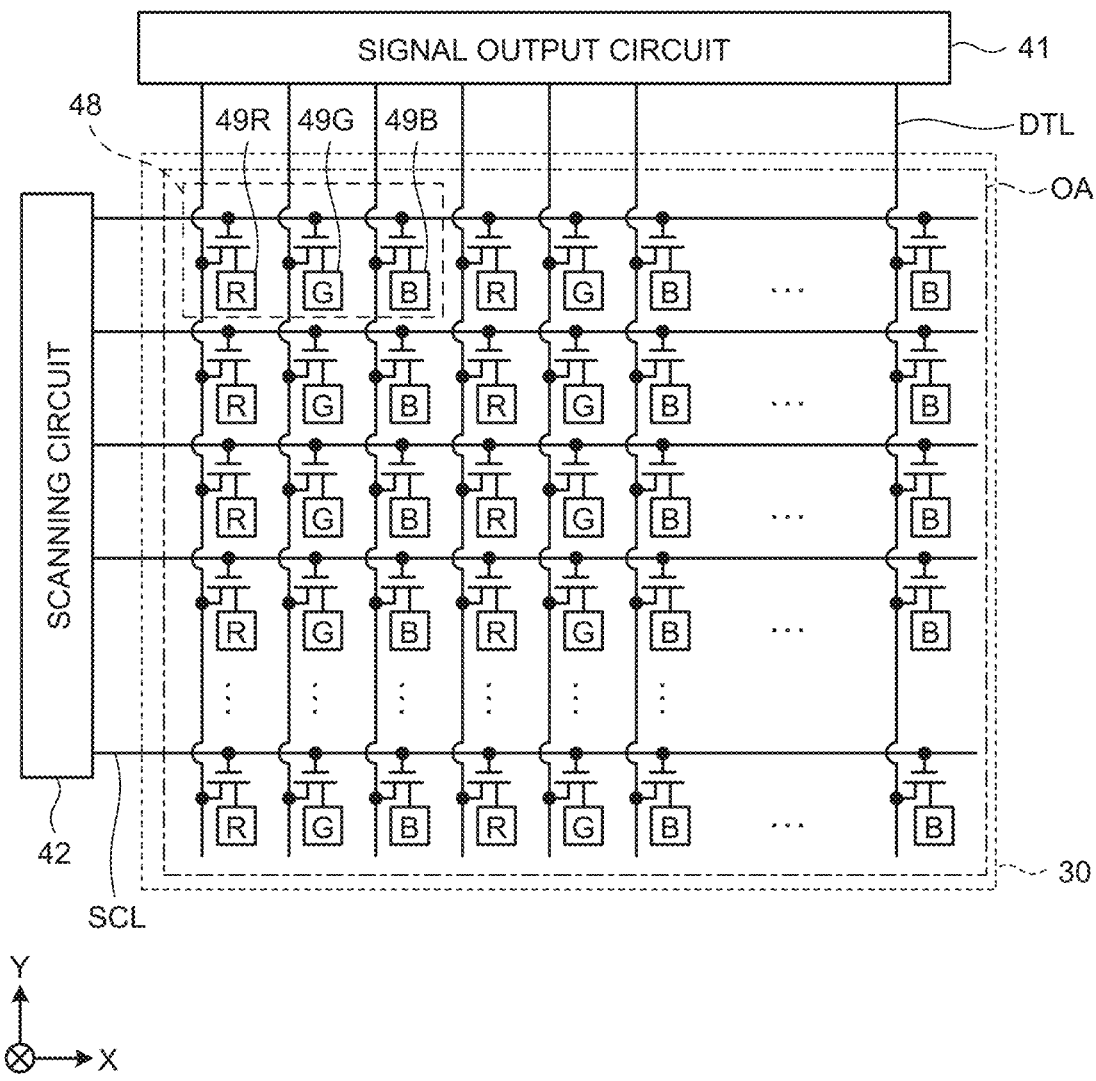

DISPLAY DEVICE

CROSS-REFERENCE TO RELATED APPLICATION

This application claims the benefit of priority from Japanese Patent Application No. 2021-166387 filed on Oct. 8, 2021, the entire contents of which are incorporated herein by reference.

BACKGROUND

1. Technical Field

What is disclosed herein relates to a display device.

2. Description of the Related Art

It is know that there is a configuration in which a light control panel is provided between a liquid crystal display panel and a light source to increase image contrast (for example, International Publication WO 2019/225137).

When the area in which a light control panel transmits light is larger than the area of pixels controlled to transmit light in a liquid crystal display panel, an image can be visually recognized with favorable display quality from wherever a user views the image, for example, from as an oblique viewpoint. However, simply expanding the area in which the light control panel transmits light is not enough to fully exert the effect of increasing image contrast. Thus, a mechanism has been required that allows users to view images from various positions and increases image contrast.

For the foregoing reasons, there is need for a display device that allows users to view images from various positions and increases image contrast.

SUMMARY

According to an aspect, a display device includes: a first panel; a second panel disposed opposing one surface of the first panel; a light source configured to emit light to the other surface of the first panel; and an acquirer configured to acquire user information including information indicating at least one of a position of an eye and a position of a head of a user located on one surface side of the second panel and facing the second panel. The first panel includes a plurality of light control pixels. The second panel includes a plurality of pixels. Blurring processing is applied by which the light control pixel positioned around a pixel controlled to transmit light in accordance with an input image signal is caused to transmit light. A blurring area including the light control pixel to which the blurring processing is applied on the first panel corresponds to the position of the eye of the user or the position of the head of the user.

BRIEF DESCRIPTION OF THE DRAWINGS

FIG. 2 is a diagram illustrating the positional relation between a display panel, a light control panel, and a light source device;

FIG. 3 is a diagram illustrating an exemplary pixel array of a display panel;

DETAILED DESCRIPTION

An embodiment of this disclosure is described below with reference to the drawings. The disclosure is only an example, and any changes that can be easily conceived by those skilled in the art while maintaining the main purpose of the invention are naturally included in the scope of the disclosure. The drawings may be schematically represented in terms of the width, thickness, shape, etc. of each part compared to those in the actual form for the purpose of clearer explanation, but they are only examples and do not limit the interpretation of this disclosure. In the present specification and the drawings, the same reference sign is applied to the same elements as those already described for the previously mentioned drawings, and detailed explanations may be omitted as appropriate.

In this disclosure, when an element is described as being "on" another element, the element can be directly on the other element, or there can be one or more elements between the element and the other element.

Figure 1:
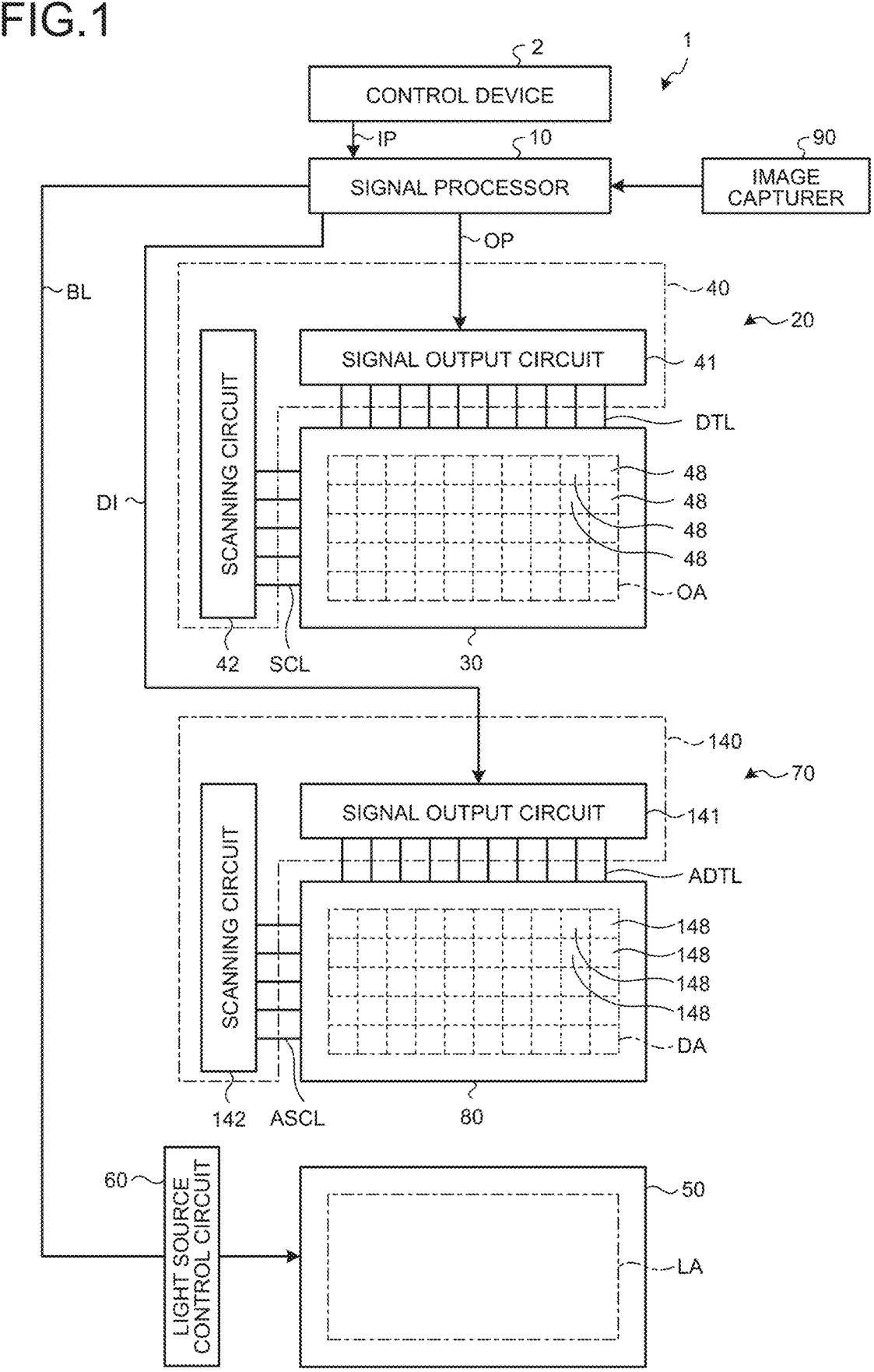
FIG. 1 is a diagram illustrating an exemplary main configuration of a display device of an embodiment.

FIG. 1 is a diagram illustrating an exemplary main configuration of a display device 1 of an embodiment. The display device 1 of the embodiment includes a signal processor (signal processing circuit) 10, a display 20, a light source device 50, a light source control circuit 60, a light controller (light dimmer circuit) 70, and an image capturer (image-capturing device) 90. The signal processor 10 performs various kinds of outputting based on an input signal IP that is input from an external control device 2 and controls operation of the display 20, the light source device 50, and the light controller 70. The input signal IP functions as data for causing the display device 1 to perform image display and is, for example, an RGB image signal. The input signal IP corresponds to the resolution of a display panel 30. Specifically, the input signal IP includes a pixel signal corresponding to the number of pixels 48 of the display panel 30 to be described later and arrangement of the pixels 48 in an X direction and a Y direction. The signal processor 10 outputs, to the display 20, an output image signal OP generated based on the input signal IP. The signal processor 10 also outputs, to the light controller 70, a light control signal DI generated based on the input signal IP. In addition, upon inputting of the input signal IP, the signal processor 10 outputs, to the light source control circuit 60, a light source drive signal BL for controlling lighting of the light source device 50. The light source control circuit 60 is, for example, a driver circuit of the light source device 50 and operates the light source device 50 in accordance with the light source drive signal BL. The light source device 50 includes a light source configured to emit light from a light emission region LA. In the embodiment, the light source control circuit 60 operates the light source device 50 so that light is emitted at a constant quantity from the light emission region LA of the light source device 50 in accordance with the display timing of a frame image.

The display 20 includes the display panel 30 and a display panel driver 40. The display panel 30 includes a display region OA provided with a plurality of pixels 48. The pixels 48 are disposed, for example, in a matrix of rows and columns. The display panel 30 of the embodiment is a liquid crystal image display panel. The display panel driver 40 includes a signal output circuit 41 and a scanning circuit 42. The signal output circuit 41 functions as what is called a source driver and drives the pixels 48 in accordance with the output image signal OP. The scanning circuit 42 functions as what is called a gate driver and outputs a drive signal for scanning, in a predetermined row unit (for example, one row), the pixels 48 disposed in a matrix of rows and columns. The pixels 48 are driven to perform gradation value outputting in accordance with the output image signal OP at the output timing of the drive signal.

The light controller 70 adjusts the quantity of light emitted from the light source device 50 and output through the display region OA. The light controller 70 includes a light control panel 80 and a light control panel driver 140.

The light control panel 80 includes a light control region DA that can change light transmittance. The light control region DA is disposed at a position overlapping the display region OA in plan view. The light control region DA overlaps the entire display region OA in plan view. The light emission region LA overlaps the entire display region OA and the entire light control region DA in plan view. Plan view is a front view of the X-Y plane.

FIG. 2 is a diagram illustrating the positional relation between the display panel 30, the light control panel 80, and the light source device 50. In the embodiment, as exemplarily illustrated in FIG. 2, the display panel 30, the light control panel 80, and the light source device 50 are stacked. Specifically, the light control panel 80 is stacked on an emission surface side where light is output from the light source device 50. The display panel 30 is stacked on an opposite side of the light control panel 80 to the light source device 50 side of the light control panel 80 such that the light control panel 80 is interposed between the display panel 30 and the light source device 50. Light emitted from the light source device 50 is subjected to light quantity adjustment at the light control region DA of the light control panel 80 to illuminate the display panel 30. The display panel 30 is illuminated from a back surface side where the light source device 50 is disposed, and displays an image on the opposite side (display surface side) to the back surface side. In this manner, the light source device 50 functions as a backlight that illuminates the display region OA of the display panel 30 from the back surface. In the embodiment, the light control panel 80 is provided between the display panel 30 and the light source device 50. Hereinafter, a Z direction is defined to be a direction in which the display panel 30, the light control panel 80, and the light source device 50 are stacked. The X direction and the Y direction are defined to be two directions orthogonal to the Z direction. The X direction is orthogonal to the Y direction. The pixels 48 are arranged in a matrix of rows and columns in the X and Y directions. Specifically, the number of pixels 48 arranged in the X direction is h, and the number of pixels 48 arranged in the Y direction is v. The numbers h and v are natural numbers equal to or larger than two.

A first polarizer P1 is provided on the back surface side of the light control panel 80. A second polarizer P2 is provided on the display surface side of the light control panel 80. A third polarizer P3 is provided on the back surface side of the display panel 30. A fourth polarizer P4 is provided on the display surface side of the display panel 30. A diffusion layer P5 is provided between the second polarizer P2 and the third polarizer P3. The first polarizer P1, the second polarizer P2, the third polarizer P3, and the fourth polarizer P4 each allow transmission of light polarized in a particular direction and do not allow transmission of light polarized in any other direction. The polarization direction of polarized light allowed to transmit through the first polarizer P1 is orthogonal to the polarization direction of polarized light allowed to transmit through the second polarizer P2. The polarization direction of polarized light allowed to transmit through the second polarizer P2 is the same as the polarization direction of polarized light allowed to transmit through the third polarizer P3. The polarization direction of polarized light allowed to transmit through the third polarizer P3 is orthogonal to the polarization direction of polarized light allowed to transmit through the fourth polarizer P4. The diffusion layer P5 diffuses and emits incident light. Since the polarization directions of the second polarizer P2 and the third polarizer P3 are the same, either one of them may be eliminated. With this configuration, improvement in transmittance is expected. When both of the second polarizer P2 and the third polarizer P3 are provided, contrast is improved as compared to a case in which only one of them is provided. When either one of the second polarizer P2 and the third polarizer P3 is omitted, it is preferable to omit the second polarizer P2, because the contrast can be improved by limiting, by the third polarizer P3, the polarization direction of light diffused by the diffusion layer P5.

FIG. 3 is a diagram illustrating an exemplary pixel array of the display panel 30. As exemplarily illustrated in FIG. 3, each pixel 48 includes, for example, a first sub pixel 49R, a second sub pixel 49G, and a third sub pixel 49B. The first sub pixel 49R displays a first primary color (for example, red). The second sub pixel 49G displays a second primary color (for example, green). The third sub pixel 49B displays a third primary color (for example, blue). In this manner, the pixels 48 arrayed in a matrix of rows and columns in the display panel 30 each include the first sub pixel 49R configured to display a first color, the second sub pixel 49G configured to display a second color, and the third sub pixel 49B configured to display a third color. The first color, the second color, and the third color are not limited to the first primary color, the second primary color, and the third primary color but may be any colors different from one another, such as complementary colors. In the following description, the first sub pixel 49R, the second sub pixel 49G, and the third sub pixel 49B are referred to as sub pixels 49 when they do not need to be distinguished from one another.

Each pixel 48 may include another sub pixel 49 in addition to the first sub pixels 49R, the second sub pixels 49G, and the third sub pixels 49B. For example, each pixel 48 may include a fourth sub pixel that displays a fourth color. The fourth sub pixel displays the fourth color (for example, white). The fourth sub pixel is preferably brighter than the first sub pixel 49R that displays the first color, the second sub pixel 49G that displays the second color, and the third sub pixel 49B that displays the third color, when they are irradiated at the same light source lighting amount.

More specifically, the display device 1 is a transmissive color liquid crystal display device. As exemplarily illustrated in FIG. 3, the display panel 30 is a color liquid crystal display panel and is provided with a first color filter that allows transmission of light in the first primary color and is disposed between the first sub pixel 49R and an image viewer, a second color filter that allows transmission of light in the second primary color and is disposed between the second sub pixel 49G and the image viewer, and a third color filter that allows transmission of light in the third primary color and is disposed between the third sub pixel 49B and the image viewer. The first color filter, the second color filter, and the third color filter are included in a filter film 26 to be described later.

In a case in which the fourth sub pixel is provided, no color filter is disposed between the fourth sub pixel and the image viewer. In this case, a large step occurs at the fourth sub pixel. Thus, the fourth sub pixel may include a transparent resin layer in place of a color filter. With this configuration, the occurrence of a large step at the fourth sub pixel can be prevented.

The signal output circuit 41 is electrically coupled to the display panel 30 by signal lines DTL. The display panel driver 40 selects the sub pixels 49 in the display panel 30 through the scanning circuit 42 and controls on-and-off of switching elements (for example, thin film transistors (TFT)) for controlling operation (light transmittance) of the sub pixels 49. The scanning circuit 42 is electrically coupled to the display panel 30 through scanning lines SCL.

In the embodiment, the signal lines DTL are arranged in the X direction. The signal lines DTL extend in the Y direction. The scanning lines SCL are arranged in the Y direction. The scanning lines SCL extend in the X direction. Thus, in the embodiment, the pixels 48 are driven in accordance with a drive signal output from the scanning circuit 42 on a pixel row (line) basis. One pixel row (line) includes a plurality of pixels 48 that are arranged in the X direction so as to share one scanning line SCL. Hereinafter, a line means a pixel row including a plurality of pixels 48 arranged in the X direction and sharing one scanning line SCL.

The extending direction of the scanning lines SCL is defined to be a horizontal scanning direction. The arrangement direction of the scanning lines SCL is defined to be a vertical scanning direction. In the embodiment, the X direction corresponds to the horizontal scanning direction, and the Y direction corresponds to the vertical scanning direction.

Figure 4:
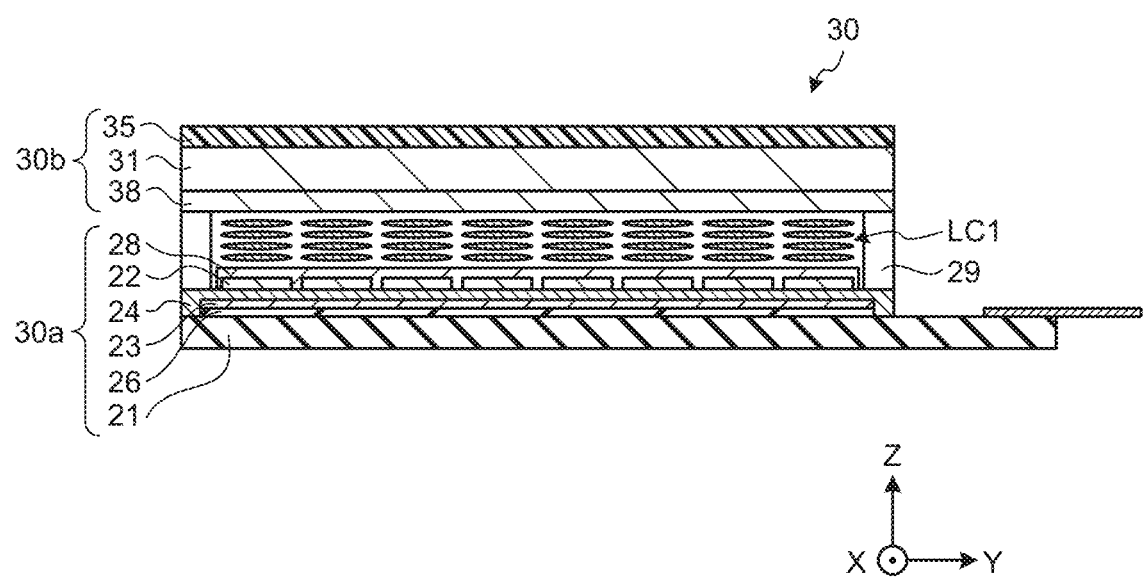
FIG. 4 is a sectional view illustrating an exemplary schematic sectional structure of the display panel.

FIG. 4 is a sectional view illustrating an exemplary schematic sectional structure of the display panel 30. An array substrate 30a includes the filter film 26 provided on the upper side of a pixel substrate 21 such as a glass substrate, a counter electrode 23 provided on the upper side of the filter film 26, an insulating film 24 provided directly on the counter electrode 23, pixel electrodes 22 on the insulating film 24, and a first alignment film 28 provided on an uppermost surface of the array substrate 30a. A counter substrate 30b includes a counter pixel substrate 31 such as a glass substrate, a second alignment film 38 provided on the lower surface of the counter pixel substrate 31, and a polarizer 35 provided on the upper surface of the counter pixel substrate 31. The array substrate 30a and the counter substrate 30b are fixed to each other with a sealing part 29 therebetween. A liquid crystal layer LC1 is sealed in a space surrounded by the array substrate 30a, the counter substrate 30b, and the sealing part 29. The liquid crystal layer LC1 contains a liquid crystal molecule having an alignment direction that changes in accordance with an applied electric field. The liquid crystal layer LC1 control light transmitted therethrough in accordance with the state of the electric field. The alignment direction of the liquid crystal molecule of the liquid crystal layer LC1 changes with an electric field applied between the pixel electrodes 22 and the counter electrode 23, and consequently, the transmission amount of light transmitting through the display panel 30 changes. The sub pixels 49 each include a pixel electrode 22. The switching elements for individually controlling operation (light transmittance) of the sub pixels 49 are electrically coupled to the pixel electrodes 22.

The light controller 70 includes the light control panel 80 and the light control panel driver 140. The light control panel 80 of the embodiment has the same configuration as the display panel 30 illustrated in FIG. 4 except that the filter film 26 is omitted. Thus, the light control panel 80 includes a light control pixel 148 provided with no color filter unlike each pixel 48 (refer to FIG. 3) including the first sub pixel 49R, the second sub pixel 49G, and the third sub pixel 49B, which are distinguished based on the colors of their color filters (refer to FIG. 1). In other words, the light control panel 80 is a monochrome liquid crystal panel.

The light control panel driver 140 including a signal output circuit 141 and a scanning circuit 142 has the same configuration as the display panel driver 40 except that the light control panel driver 140 is coupled to the light control panel 80. Signal lines ADTL between the light control panel 80 and the light control panel driver 140 illustrated in FIG. 1 have the same configuration as the signal lines DTL described above with reference to FIG. 3. Scanning lines ASCL between the light control panel 80 and the light control panel driver 140 illustrated in FIG. 1 have the same configuration as the scanning lines SCL described above with reference to FIG. 3. In the light control panel 80 of the present embodiment, two or more of the light control pixels 148 are controlled as one light control unit. The area that is controlled as one light control unit in the light control panel 80 includes a plurality of pixels 48 in plan view. In description of the embodiment, the width of the area that is controlled as one light control unit in the X direction corresponds to the width of three pixels 48 arranged in the X direction. The width of the area that is controlled as one light control unit in the Y direction corresponds to the width of three pixels 48 arranged in the Y direction. Thus, 3×3=9 pixels 48 are disposed in the area that is controlled as one light control unit. The number of pixels 48 in the area that is controlled as one light control unit exemplified above is merely an example and not limited thereto, and may be changed as appropriate. For example, 2×2=4 pixels 48 may be disposed in the area that is controlled as one light control unit.

In the light control panel 80, one pixel electrode 22 or a plurality of pixel electrodes 22 may be provided in the area that is controlled as one light control unit. When a plurality of pixel electrodes 22 are provided in the area that is controlled as one light control unit, these pixel electrodes 22 are controlled to be equipotential. Consequently, these pixel electrodes 22 can behave as one pixel electrode 22 in effect.

In the embodiment, disposition of the pixels 48 in the display region OA is the same as disposition of the light control pixels 148 in the light control region DA. Thus, in the embodiment, the number of pixels 48 arranged in the X direction in the display region OA is equal to the number of light control pixels 148 arranged in the X direction in the light control region DA. In the embodiment, the number of pixels 48 arranged in the Y direction in the display region OA is equal to the number of light control pixels 148 arranged in the Y direction in the light control region DA. In the embodiment, the display region OA and the light control region DA overlap each other in X-Y plan view. The Z direction corresponds to an optical axis LL of light emitted from the light emission region LA of the light source device 50. Thus, an optical axis (optical axis LL) of light passing through one of the pixels 48 coincides with an optical axis of light passing through one light control pixel 148 located at a position overlapping with the one pixel 48 in X-Y plan view. However, light emitted from the light emission region LA is incoherent light that radially diffuses. Thus, a light beam in a direction not aligned with the optical axis LL enters the light control pixel 148 and the pixel 48 in some cases.

Light emitted from the light source device 50 enters the light control panel 80 through the first polarizer P1. Light having transmitted through the light control pixel 148 of the light control panel 80 enters the display panel 30 through the second polarizer P2, the diffusion layer P5, and the third polarizer P3. Light having transmitted through the pixels 48 of the display panel 30 is output through the fourth polarizer P4. An image output from the display device 1 is visually recognized by a user of the display device 1 based on the light output in this manner.

Assuming that an image is viewed by a user from the front side of a plate surface (X-Y plane) of the display device 1. In this case, it is considered that the user of the display device 1 can view the image output from the display device 1 with no problem when a light control pixel 148 capable of transmitting light having an optical axis that coincides with the optical axis LL passing through a pixel 48 controlled to transmit light in the display panel 30, is controlled to transmit light. In this case, any light control pixel 148 corresponding to a pixel 48 controlled not to transmit light in the display panel 30 (i.e., the light control pixel 148 an optical axis of which coincides with an optical axis of the pixel 48 controlled not to transmit light) is controlled not to transmit light. However, the user of the display device 1 does not always view an image from the front side of the plate surface (X-Y plane) of the display device 1. When the pixels 48 and the light control pixels 148 are controlled in the same manner as in the above-described case in which an image is viewed from the front side of the plate surface (X-Y plane) of the display device 1, a user who views the fourth polarizer P4 side of the display device 1 in a direction having an angle (perspective angle) intersecting the plate surface and the Z direction, visually recognizes a double image and a partially missing image in some cases.

Figure 5:
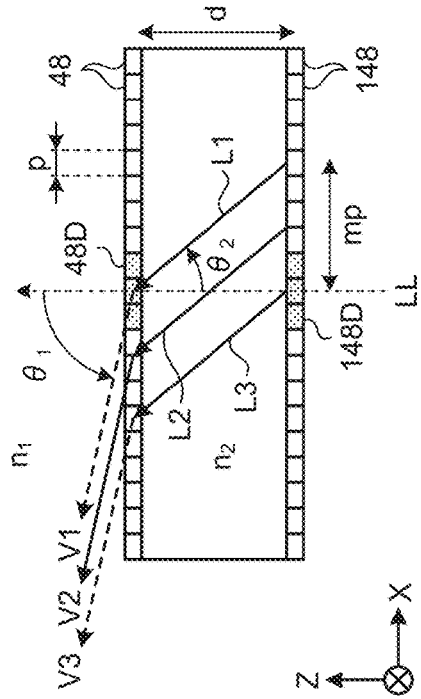
FIG. 5 is a diagram illustrating the generation principles and examples of a double image and a partially missing image.

FIG. 5 is a diagram illustrating the generation principles and examples of the double image and the partially missing image. In FIG. 5, schematic sectional views of the display device 1 are illustrated in the column of "PANEL SCHEMATIC DIAGRAM". In the schematic sectional views, pixels 48 and light control pixels 148 at which the liquid crystal orientation is controlled to transmit light are illustrated with white rectangles. In the schematic sectional view, a set of a plurality of pixels 48 at which the liquid crystal orientation is controlled not to transmit light are illustrated as a light-blocking part 48D with dotted rectangles. In the schematic sectional views, a set of a plurality of light control pixels 148 at which the liquid crystal orientation is controlled not to transmit light, is illustrated as a light-blocking part 148D with dotted rectangles.

Light is transmitted through a light control pixel 148, through a multilayered structure (the second polarizer P2, the diffusion layer P5, and the third polarizer P3) between the light control pixel 148 and a pixel 48, and then through the pixel 48, and finally emitted from the emission surface side of the display panel 30 through the fourth polarizer P4 (refer to FIG. 2). When the light is emitted from the emission surface side of the display panel 30, refraction occurs due to the refractive index difference between the multilayered structure and the air on the emission surface side. In FIG. 5, the refraction is indicated as the difference between the traveling angle $\theta_2$ of light in the display device 1 and the emission angle $\theta_1$ of light outside the emission surface of the display device 1. The traveling angle $\theta_2$ is an angle due to the difference between the refractive index $n_2$ of the multilayered structure and the refractive index $n_1$ of the air.

More specifically, Expression (1) below is satisfied. In addition, Expression (2) below is satisfied when d represents the interval between a pixel 48 and a light control pixel 148 in the Z direction. In Expression (2), p represents the width of the pixel 48 in the X direction. In Expression (2), m represents a numerical value that indicates the amount of a positional shift in the X direction between a light emission point on the light control pixel 148 side and a light incident point on the pixel 48 side and is expressed in terms of the number of pixels 48, the positional shift occurring due to the traveling angle $\theta_2$ of light in the display device 1. The air refractive index ($n_1$) is 1.0, and the refractive index ($n_2$) of the multilayered structure (the second polarizer P2, the diffusion layer P5, and the third polarizer P3) is different from 1.0. Expression (3) is satisfied based on Expressions (1) and (2). Thus, a blurring area mp having a center at the optical axis LL and corresponding to $\theta_1$ can be calculated from $n_1$, $n_2$, and $\theta_1$ based on Expression (3). Any light control pixel 148 included in the blurring area mp is controlled to transmit light. d is, for example, the interval between the middle position of each pixel 48 in the Z direction and the middle position of each light control pixel 148 in the Z direction. The middle position of each pixel 48 in the Z direction is the middle position of the display panel 30 in the Z direction. The middle position of each light control pixel 148 in the Z direction is the middle position of the light control panel 80 in the Z direction. d may be regarded as the distance of the liquid crystal layer LC1 between the display panel 30 and the light control panel 80.

$$n_1 \sin \theta_1 = n_2 \sin \theta_2 \quad (1)$$

$$d \tan \theta_2 = mp \quad (2)$$

$$mp = d \tan \{\sin^{-1}(n_1 \sin \theta_1/n_2)\} \quad (3)$$

As illustrated in the column of "PANEL SCHEMATIC DIAGRAM" and the row of "DOUBLE IMAGE", due to the above-described refraction, light L1 having transmitted through a light control pixel 148 is emitted as light V1 when it is assumed that the light is not blocked by the light-blocking part 48D. In reality, the light V1 is not emitted because the light is blocked by the light-blocking part 48D. Light L2 having transmitted through a light control pixel 148 is output as light V2. Light transmitted on a light traveling axis L3 is emitted as light V3 illustrated with a dashed line when it is assumed that light is not blocked by the light-blocking part 148D.

In a front view of the emission surface of the display device 1 in the state illustrated in the column of "PANEL SCHEMATIC DIAGRAM" and the row of "DOUBLE IMAGE", both sides of the light-blocking part 48D in the X direction are lighted. In other words, one non-light emission (black) region is observed in front view. However, when the emission surface of the display device 1 is visually recognized at a perspective angle corresponding to an emission angle $\theta_1$ relative to the X-Y plane and the X direction, the optical axes of the light L1 and the light L3, which do not exist in reality, exist with the light V2 interposed therebetween. In other words, two non-light emission (black) regions occur in the X direction with the light V2 interposed therebetween. In this manner, an image to be formed as one non-light emission (black) region when viewed in front view may be visually recognized as a double image formed of two non-light emission (black) regions when viewed at a perspective angle. In FIG. 5, a generation example of such a double image is exemplarily illustrated in the column of "EXAMPLE OF VISUALLY RECOGNIZED IMAGE TAKEN FROM OBLIQUE VIEWPOINT" and the row of "DOUBLE IMAGE".

As illustrated in the column of "PANEL SCHEMATIC DIAGRAM" and the row of "DEFECT IN IMAGE", light L4 is emitted as light V4 when it is assumed that the light is not blocked by the light-blocking part 148D. In reality, the light V4 is not emitted because light is blocked by the light-blocking part 148D. Light L5 is emitted as light V5 when it is assumed that the light is not blocked by the light-blocking part 148D. In reality, the light V5 is not emitted because light is blocked by the light-blocking part 148D. Even when light is not blocked by the light-blocking part 148D, the light V5 is not emitted because the light is blocked by the light-blocking part 48D. When it is assumed that light is not blocked by the light-blocking part 48D, light L6 having transmitted through the light control pixel 148 is emitted as light V6. In reality, the light V6 is not emitted because the light is blocked by the light-blocking part 48D.

In the state illustrated in the column of "PANEL SCHEMATIC DIAGRAM" and the row of "DEFECT IN IMAGE", a pixel 48 that can transmit light is sandwiched between light-blocking parts 48D in the X direction, and thus, one light emission region sandwiched between non-light emission (black) regions is visually recognized in front view. However, no light emission region is visually recognized when the emission surface of the display device 1 is visually recognized at a perspective angle corresponding the emission angle $\theta_1$ relative to the X-Y plane and the X direction. This is because the light V4, the light V5, and the light V6 are not emitted as described above. In this manner, an image formed in one light emission region in front view is not visually recognized at a perspective angle in some cases. An image crack when the display device 1 is visually recognized at a perspective angle is generated through such a mechanism. In FIG. 5, a generation example of such a partially missing image is exemplarily illustrated in the column of "EXAMPLE OF VISUALLY RECOGNIZED IMAGE TAKEN FROM OBLIQUE VIEWPOINT" and the row of "DEFECT IN IMAGE". In FIG. 5, each light control unit is illustrated as one light control pixel 148; however, in reality, each light control unit includes more than one light control pixel 148. Each light control pixel 148 schematically illustrated in FIG. 5 has the same width in the X direction as that of each pixel 48 to facilitate understanding of positional correspondence with the pixels 48, however in reality, more than one pixel 48 is included in the area of one light control unit as described above.

Thus, in the embodiment, blurring processing is applied in control of an area in the light control panel 80 that transmits light. The blurring processing is processing that controls the light control pixels 148 so that the light control panel 80 transmits light in an area wider than a light transmission area obtained when light is transmitted faithfully to the input signal IP. Thus, an area in which light can transmit in the light control panel 80 to which the blurring processing is applied is larger than an area in which light can transmit in the display panel 30. The blurring processing will be described below with reference to FIG. 6.

Figure 6:
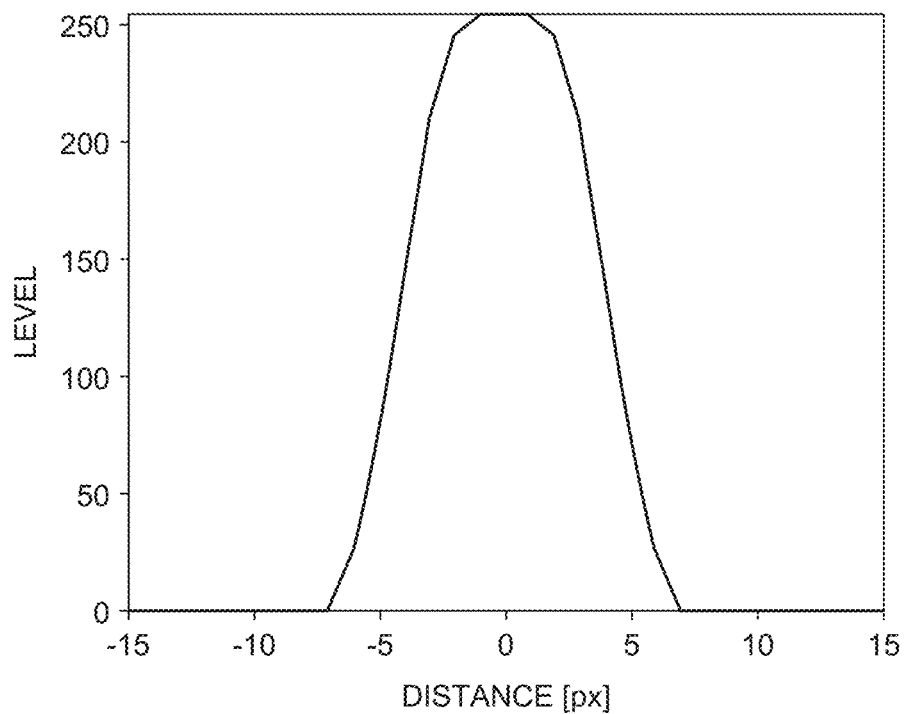
FIG. 6 is a graph illustrating an exemplary relation between the distance from a light control pixel transmitting light having an optical axis that coincides with an optical axis of light passing through a pixel that is controlled to transmit light at the highest gradation and the degree (level) of light transmission that is controlled by blurring processing.

FIG. 6 is a graph illustrating an exemplary relation between the distance from a light control pixel 148 transmitting light having an optical axis that coincides with the optical axis LL of light passing through a pixel 48 that is controlled to transmit light at highest gradation and the degree (level) of light transmission that is controlled by the blurring processing. In the graph in FIG. 6, the horizontal axis represents the distance, and the vertical axis represents the degree of light transmission. The distance is measured with respect to a "0" distance position where a light control pixel 148 is positioned which transmits light having the optical axis LL that coincides with the optical axis of light passing through a pixel 48 that is controlled to transmit light at the highest gradation. A light control pixel 148 adjacent to the light control pixel 148 at "0" distance is positioned at "1" distance relative to the light control pixel 148 at "0" distance. Other light control pixels 148 are each arranged in the X direction or the Y direction at the distance of the number of intervening light control pixels 148 plus one with reference to the light control pixel 148 at "0" distance. Although FIG. 6 illustrates the example in which the degree of light transmission has is expressed with a gradation of eight bits (256 gradations), this is merely an example and the present invention is not limited thereto. The number of gradation levels may be changed as appropriate.

As exemplarily illustrated in FIG. 6, in the embodiment, not only the light control pixel 148 at "0" distance that transmits light having the optical axis LL that coincides with the optical axis LL of light passing through the pixel 48 that is controlled to transmit light, but also the light control pixels 148 at the distance of "1" to "6" are controlled to transmit light by the blurring processing. The light control pixel 148 at "1" distance is controlled to transmit light at the same degree as the light control pixel 148 at "0" distance. The light control pixel 148 at the distance of "2" or larger is controlled so that the degree of light transmission decreases as the distance increases.

A specific range of the distance from the light control pixel 148 at "0" distance, which defines the area to be controlled to transmit light by the blurring processing, is appropriately set. More specifically, a range of the distance from the light control pixel 148 at "0" distance to which the blurring processing is applied is set based on data such as an allowable range of an angle ($\theta_1$) at which an oblique viewpoint relative to the display device 1 is established, the size of the above-described interval d, and the like. Similarly, a blurring processing target area is set which is centered at a certain pixel 48 in processing performed based on the gradation values of the pixels 48 by a blurring processing calculator 12 to be described later.

Figure 7:
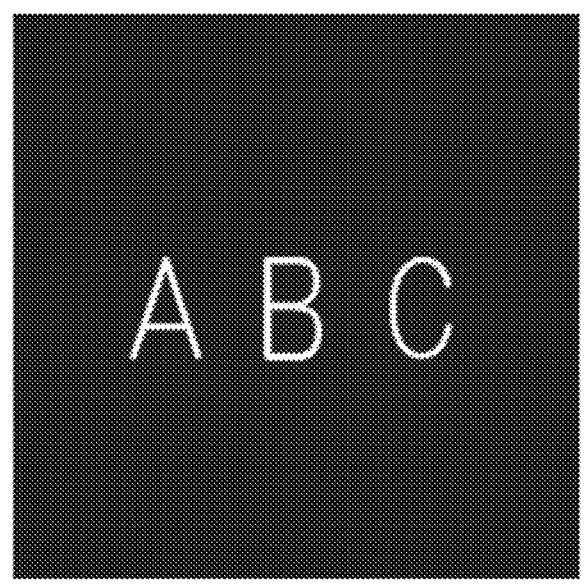
FIG. 7 is a diagram illustrating an exemplary display output image based on an input signal to the display device.
Figure 8:
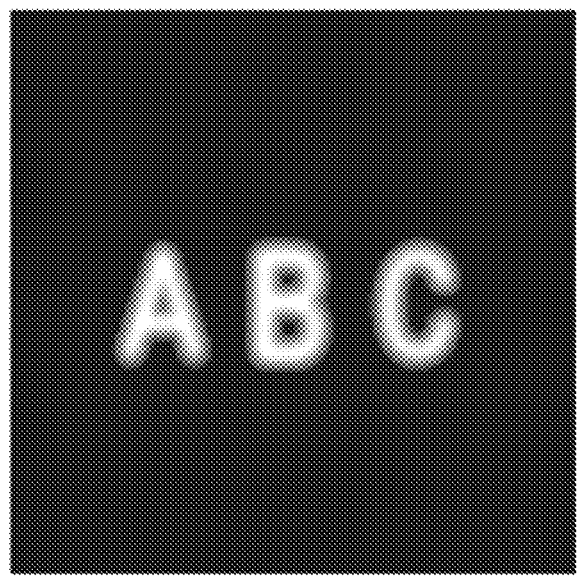
FIG. 8 is a diagram illustrating the area of light transmission of the light control panel to which blurring processing is applied based on the display output image illustrated in FIG. 7.

FIG. 7 is a diagram illustrating an exemplary display output image based on the input signal IP to the display device 1. FIG. 8 is a diagram illustrating the area of light transmission of the light control panel 80 to which the blurring processing is applied based on the display output image illustrated in FIG. 7. In FIGS. 7 and 8, an area controlled to transmit light is illustrated in white, and an area controlled not to transmit light is illustrated in black. As indicated by comparison between FIGS. 7 and 8, in the light control panel 80 to which the blurring processing is applied, the light control pixels 148 are controlled to transmit light in a wider area than the display output image. Specifically, the degree of light transmission by the light control pixels 148 is controlled by thickening the edge line of the area of light transmission in the display output image illustrated in FIG. 7 to increase the area of light transmission outward.

Figure 9:
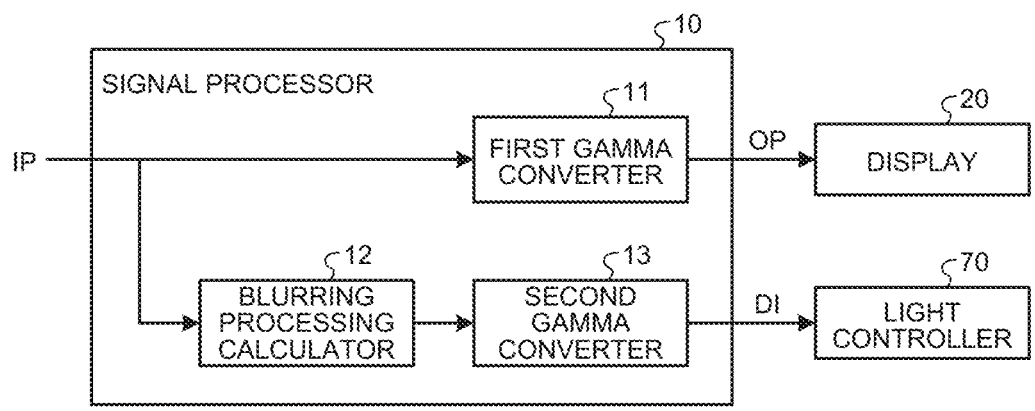
FIG. 9 is a block diagram illustrating an exemplary functional configuration of a signal processor.

FIG. 9 is a block diagram illustrating an exemplary functional configuration of the signal processor 10. The signal processor (signal processing circuit) 10 includes a first gamma converter (first gamma conversion circuit) 11, a blurring processing calculator (blurring processing circuit) 12, and a second gamma converter (second gamma conversion circuit) 13.

The first gamma converter 11 performs gamma correction processing when gamma correction between an input value and an output value is necessary. The input value is the RGB gradation value of each pixel included in a frame image indicated by the input signal IP. The output value indicates brightness of each pixel 48 included in the display panel 30 perceived by a user visually recognizing the display region OA when the pixel 48 is controlled at a voltage in accordance with the input value. In the embodiment, an appropriate output value is obtained by controlling each pixel 48 in accordance with the input value based on a one-to-one relation between the RGB gradation value and the pixel 48, and thus no correction is performed. However, the gamma correction processing is performed by the first gamma converter 11, depending on the gamma characteristic of the display panel 30.

In the embodiment, as in the above description of the first gamma converter 11, an RGB gradation value (input value) indicated by pixel data provided to a pixel 48 at a certain position by the input signal IP corresponding to one frame image is the same as an RGB gradation value (output value) indicated by pixel data provided to the pixel 48 by the output image signal OP based on the input signal IP. Thus, Ic=g0 (Ic) is satisfied when Ic represents the input value and g0(Ic) represents the output value. The output value g0(Ic) can be expressed in the format of the RGB gradation value, namely, (R, G, B)=($\alpha$, $\beta$, $\gamma$) The values $\alpha$, $\beta$, and $\gamma$ are each a numerical value corresponding to the number of bits of information indicating a gradation value. For example, in a case of eight bits, $\alpha$, $\beta$, and $\gamma$ each has a value within a range of 0 to 255.

The second gamma converter 13 illustrated in FIG. 9 performs gamma correction processing when gamma correction is necessary for a light control gradation value. In the embodiment, the second gamma converter 13 performs the gamma correction processing so that a gamma curve between the lowest gradation (0) and the highest gradation (255 when it is expressed with 8 bits) for each of the light control panel 80 and the display panel becomes a desired gamma curve (for example, gamma curve corresponding to gamma value=2.2). When g1 represents a coefficient used in the gamma correction processing, the light control gradation value after the gamma correction processing by the second gamma converter 13 can be expressed as g1 ($Ic_{max}$+A).

The first gamma converter 11 illustrated in FIG. 9 outputs the output image signal OP to the display panel 30. The output image signal OP is a set of the above-described values g0(Ic) for the respective pixels 48. Each pixel 48 is driven in accordance with g0(Ic) by the operation of the display panel driver 40. The second gamma converter 13 outputs the light control signal DI to the light control panel 80. The light control signal DI is a set of the above-described values g1($Ic_{max}$+A) for the respective light control pixels 148. Each light control pixel 148 is driven in accordance with g1($Ic_{max}$+A) by the operation of the light control panel driver 140. Specifically, the light control panel 80 operates so that the degree of light transmission of each light control pixel 148 corresponds to the light control gradation value thereof. In the embodiment, a plurality of sub pixels 49 included in one light control pixel 148 are all driven to achieve the degree of light transmission corresponding to the light control gradation value of the one light control pixel 148.

The blurring processing calculator 12 performs the above-described blurring processing. In addition, the blurring processing calculator 12 derives the blurring area. The blurring area includes any light control pixel 148 to which the blurring processing is applied.

Figure 10:
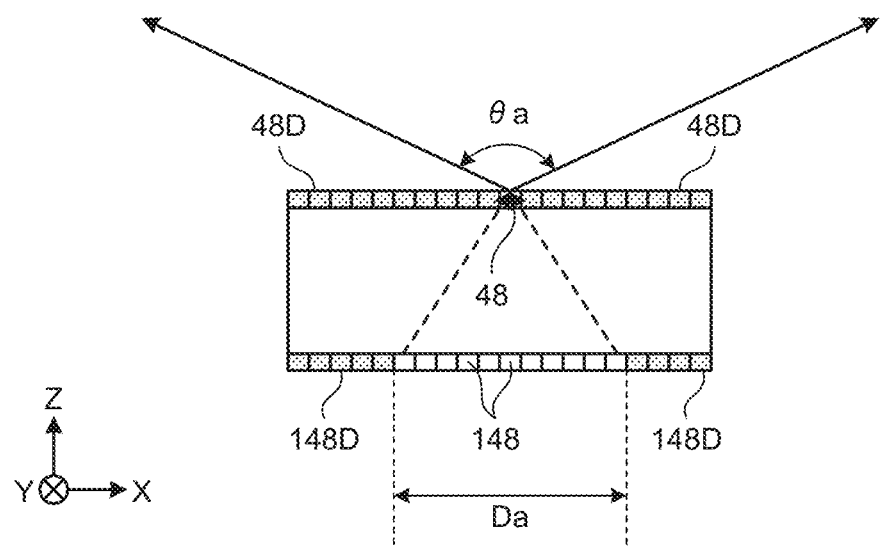
FIG. 10 is a schematic diagram illustrating a blurring area that is necessary in a case in which the positions of the eyes of a user relative to the display panel are unknown.
Figure 11:
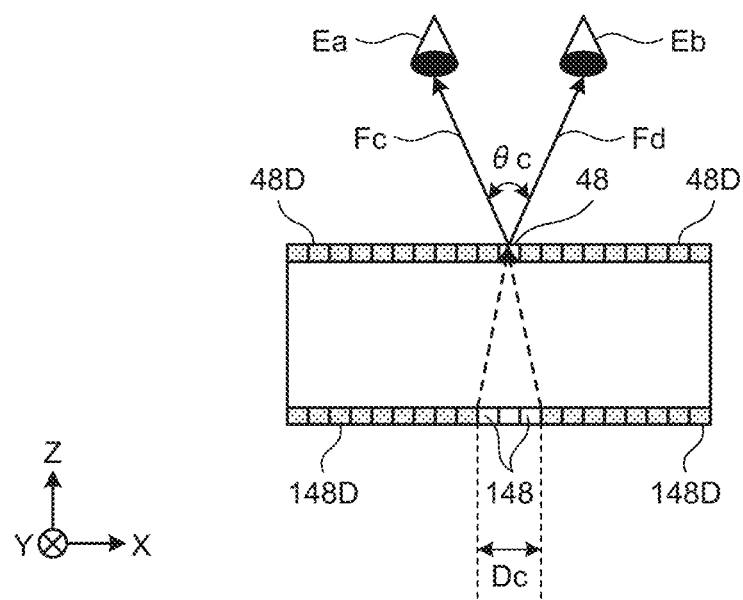
FIG. 11 is a schematic diagram illustrating a blurring area that is necessary when the positions of the eyes of the user relative to the display panel are known.
Figure 12:
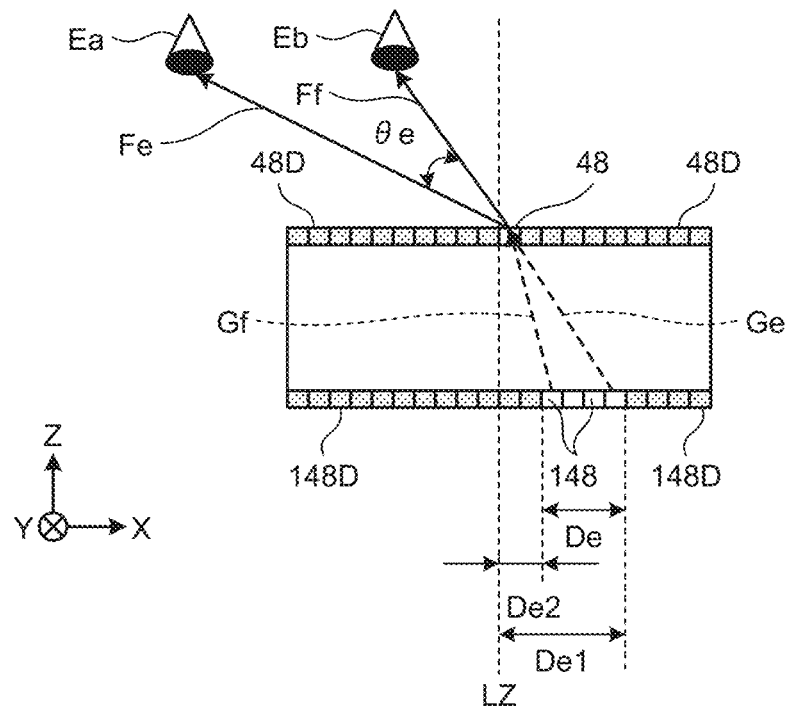
FIG. 12 is a schematic diagram illustrating a blurring area that is necessary when the positions of the eyes of the user relative to the display panel are known.

In the embodiment, the blurring processing calculator 12 derives the blurring area so that the blurring area corresponds to the positions of the eyes of a user relative to the display panel 30. Before description of a method of determining the blurring area, the following describes, with reference to FIGS. 10 to 12, comparison between a case in which the positions of the eyes of the user relative to the display panel 30 are unknown and a case in which the positions of the eyes of the user relative to the display panel 30 are known. The user is a person who visually recognizes an image output from the display device 1.

FIG. 10 is a schematic diagram illustrating a blurring area that is necessary in the case in which the position of a user's eye relative to the display panel 30 is unknown. In the case in which the position of a user's eye relative to the display panel 30 is unknown, a blurring area Da is applied to the light control panel 80. The blurring area Da is determined in advance so that the blurring processing is applied irrespective of the line of sight of the user to the display panel 30. Hereinafter, the line of sight is referred to as a visual line.

Specifically, the blurring area Da is determined in advance depending on, for example, the view angle of the display panel 30. FIG. 10 illustrates a view angle θa in the X direction depending on panel characteristics of the display panel 30. The half angle of the view angle θa is substituted as $θ_1$ in Expression (3). In Expression (3), $n_2$ is identified in advance as a value depending on the multilayered structure (the second polarization plate P2, the diffusion layer P5, and the third polarization plate P3) between the light control pixels 148 and the pixels 48 by measurement or the like in advance. As described above, $n_1$ is 1.0. Thus, the blurring area Da is derived by setting mp calculated based on Expression (3) as the distance in the X-direction of a blurring area centered at a light control pixel 148 overlapping, in the Z direction, a pixel 48 controlled to transmit light. The blurring area Da is an area centered at the light control pixel 148 that includes an area extending in +X direction from the light control pixel 148 to a position at a distant of mp from the light control pixel 148 and includes an area extending in −X direction from the light control pixel 148 to a position at a distant of mp from the light control pixel 148. Thus, the blurring area Da is twice (=2 mp) as large as mp calculated by substituting the half angle of the view angle θa as $θ_1$ in Expression (3).

FIGS. 11 and 12 are each a schematic diagram illustrating a blurring area that is necessary when the position of a user's eye relative to the display panel 30 is known. When the position of a user's eye relative to the display panel 30 is known, the blurring area is applied to the light control panel 80 based on the angle between both eyes of the user at a pixel 48 controlled to transmit light.

In FIG. 11, it is assumed that the face of the user is located in front of the pixel 48 controlled to transmit light. Thus, in the example illustrated in FIG. 11, the half angle of an angle θc centered at the pixel 48 between a visual line Fc from one eye Ea of the user to the pixel 48 and a visual line Fd from the other eye Eb to the pixel 48 in the X direction is substituted as $θ_1$ in Expression (3). Thus, a blurring area Dc is derived by setting mp calculated based on Expression (3) as the distance in the X-direction of a blurring area centered at a light control pixel 148 overlapping, in the Z direction, the pixel 48 controlled to transmit light. With the same principle as that of the blurring area Da, the blurring area Dc is twice (=2 mp) as large as mp calculated by substituting the half angle of the angle θc as $θ_1$ in Expression (3).

The angle θc is smaller than the view angle θa as indicated in comparison between FIGS. 10 and 11. Thus, the blurring area Dc is smaller than the blurring area Da.

The one eye Ea is the right eye of the user and positioned on the left side when viewed from the display panel 30. The other eye Eb is the left eye of the user and positioned on the right side when viewed from the display panel 30.

In FIG. 12, it is assumed that the face of the user is located in a direction oblique to the pixel 48 that is controlled to transmit light. In this case as well, an angle θe centered at the pixel 48 between a visual line Fe from the one eye Ea of the user to the pixel 48 and a visual line Ff from the other eye Eb to the pixel 48 in the X direction is smaller than the view angle θa. Thus, a blurring area De determined in accordance with the visual lines Fe and Ff is smaller than the blurring area Da. A specific method of calculating a blurring area (for example, the blurring area De illustrated in FIG. 12) when the face of the user is located in a direction oblique to the pixel 48 that is controlled to transmit light will be described later.

As described above with reference to FIGS. 10 to 12, when the position of a user's eye relative to the display panel 30 is known, a blurring area can be set smaller than that when the position of a user's eye relative to the display panel 30 is unknown.

The following describes a more specific method of deriving a blurring area with reference to FIGS. 13, 14, 15, and 16.

Figure 13:
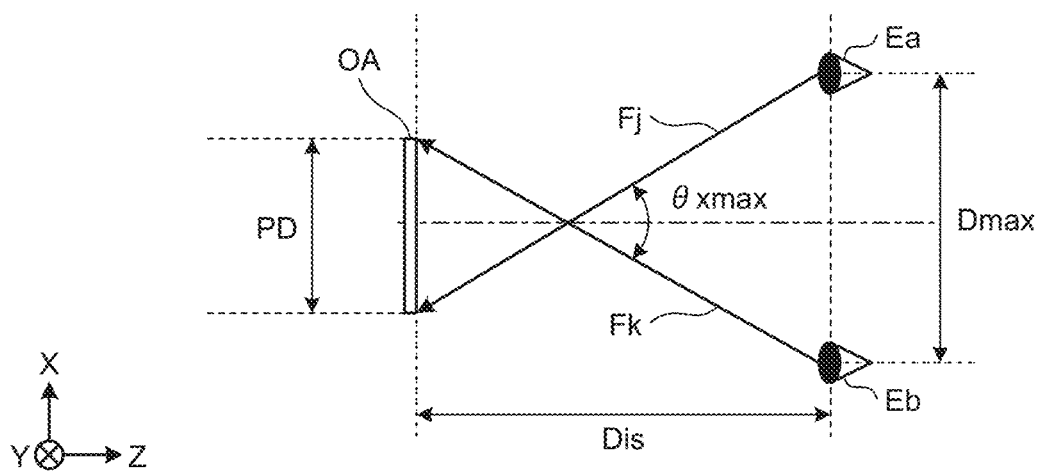
FIG. 13 is a diagram illustrating the maximum angle of the visual line of the user when it is assumed that the eyes of the user can move in a maximum movable area Dmax in an X direction.

FIG. 13 is a diagram illustrating the maximum angle θxmax of the visual line of the user when it is assumed that the eyes of the user can move in a maximum movable area Dmax in the X direction. The maximum angle θx max is the angle between a visual line Fj and a visual line Fk. Hereinafter, one end of the maximum movable area Dmax in the X direction is referred to as a first end of the maximum movable area Dmax, and the other end of the maximum movable area Dmax in the X direction is referred to as a second end of the maximum movable area Dmax. One end of the display region OA in the X direction is referred to as a first end of the display region OA, and the other end of the display region OA in the X direction is referred to as a second end of the display region OA. In the X direction, the first end of the display region OA is closer to the first end of the maximum movable area Dmax, and the second end of the display region OA is closer to the second end of the maximum movable area Dmax. In this configuration, the visual line Fj is a visual line from the one eye Ea positioned at the first end of the maximum movable area Dmax to the pixel 48 positioned at the second end of the display region OA. The visual line Fk is a visual line from the other eye Eb positioned at the second end of the maximum movable area Dmax to the pixel 48 positioned at the first end of the display region OA.

The maximum angle θxmax is calculated by Expression (4) below based on a panel width PD, a length of the maximum movable area Dmax, and a distance Dis. The panel width PD is the width of the display region OA in the X direction. The length of the maximum movable area Dmax corresponds to a length of an area in which the eyes of the user can move in the X direction. The distance Dis is the distance from the display region OA to the eyes of the user (the one eye Ea and the other eye Eb) in the Z direction. An angle to be substituted as $θ_1$ in Expression (3) described above can be calculated by halving the maximum angle θxmax.

$$θx\ max = 2 \times a\ tan\ [\{(D\ max/2)+(PD/2)\}/Dis] \quad (4)$$

In the description with reference to FIG. 10, the view angle θa of the display panel 30 corresponds to the maximum blurring area. However, when it is assumed that the movement area of the user is limited to the maximum movable area Dmax as illustrated in FIG. 13 and the maximum angle θxmax is smaller than the view angle θa, a blurring area is calculated by substituting the half value of the maximum angle θxmax as $θ_1$ in Expression (3) described above. The calculated blurring area is regarded as a blurring area when the position of a user's eye relative to the display panel 30 is unknown.

Figure 14:
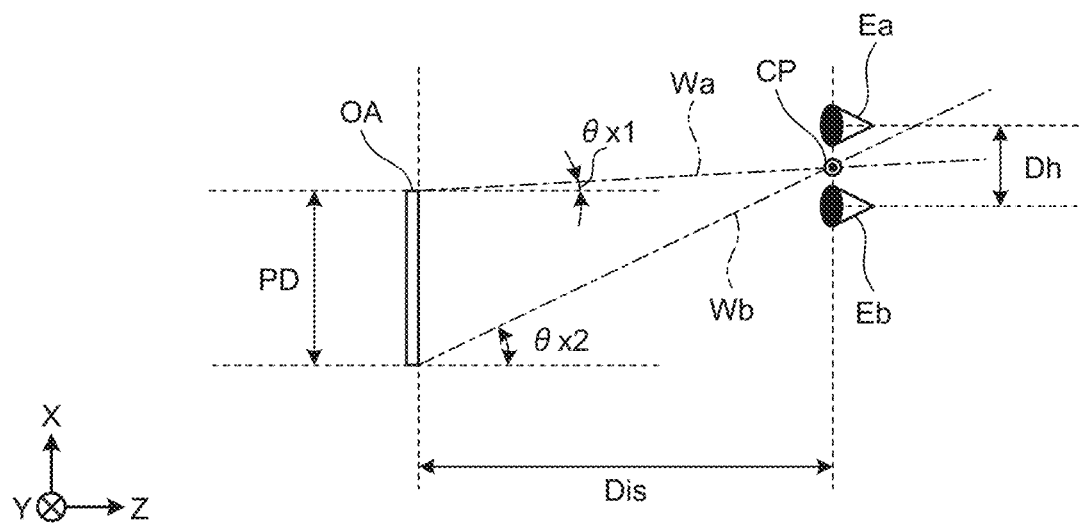
FIG. 14 is a diagram illustrating an exemplary reference axis angle relative to a display region when the face of the user is located in a direction oblique to the X direction relative to the display region.

FIG. 14 is a diagram illustrating exemplary reference axis angles θx1 and θx2 relative to the display region OA when the face of the user is located in a direction oblique to the X direction relative to the display region OA. In the example illustrated in FIG. 14, the user views the display region OA from a position closer to the first end of the display region OA in the X direction. The middle point between the one eye Ea and the other eye Eb in the X direction is referred to as a middle point CP. As illustrated in FIG. 14, a reference line Wa connecting the middle point CP and the first end of the display region OA in the X direction has the reference axis angle θx1 relative to an axis line (Z axis) along the Z direction. A reference line Wb connecting the middle point CP and the second end of the display region OA in the X direction has the reference axis angle θx2 relative to the axis line (Z axis) along the Z direction. When the face of the user is located in a direction oblique to the X direction relative to the display region OA, the above-described optical axis LL does not align with the Z direction but, like the reference line Wa and the reference line Wb, has a different tilt relative to the Z direction depending on the position of a pixel 48 to which a visual line points.

As exemplarily illustrated in FIG. 14, even when the position of the face of the user relative to the display region OA is uniquely determined as described above, the angle between the Z axis and a straight line connecting a point (for example, the middle point CP) on the face of the user and a position in the display region OA is different depending on the position in the display region OA.

Figure 15:
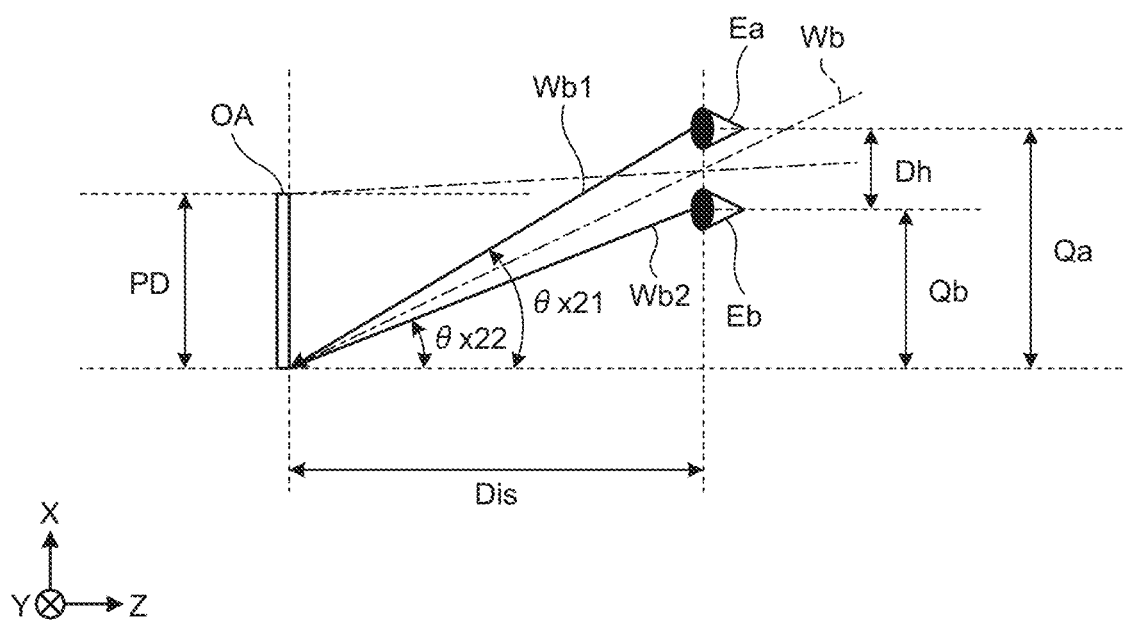
FIG. 15 is a diagram illustrating the angle between a visual line from one of the eyes to a second end of the display region in the X direction and a Z axis, and the angle between a visual line from the other eye to the second end and the Z axis when the face of the user is located at the position illustrated in FIG. 14.

FIG. 15 is a diagram illustrating an angle θx21 between a visual line Wb1 from the one eye Ea to the second end of the display region OA in the X direction and the Z axis, and an angle θx22 between a visual line Wb2 from the other eye Eb to the second end and the Z axis when the face of the user is located at the position illustrated in FIG. 14. As illustrated in FIGS. 14 and 15, the one eye Ea and the other eye Eb are separated from each other by an inter-eye distance Dh in the X direction with the middle point CP interposed therebetween. Thus, the angle θx21 of the visual line Wb1 from the one eye Ea to the second end relative to the Z axis is different from the angle θx22 of the visual line Wb2 from the other eye Eb to the second end relative to the Z axis.

When ex represents an angle, such as the angle θx21 or θx22, in the X direction between the Z axis and a straight line connecting an eye and a point to which the visual line of the eye points in the display region OA, θx can be expressed by Expression (5) below. In Expression (5), Q represents the distance between the eye and the point in the display region OA in the X direction.

$$\theta x = a\tan[Q/Dis] \qquad (5)$$

Assume that the distance Dis is 50 cm, for example. In addition, assume that a distance Qa between the one eye Ea and the second end of the panel width PD (display region OA) in the X direction as illustrated in FIG. 15 is 40 cm. In this case, the angle θx21 can be calculated as θx in Expression (5) by substituting the distance Qa into Q in Expression (5). In this case, the angle θx21 is 38.7° approximately.

When the inter-eye distance Dh is 7.2 cm, a distance Qb between the other eye Eb and the second end of the panel width PD (display region OA) in the X direction illustrated in FIG. 15 is 32.8 cm. Thus, the angle θx22 can be calculated as ex in Expression (5) by substituting the distance Qb into Q in Expression (5). The angle θx22 is 33.3° approximately. Thus, the angle difference of 5.4° between the angle θx21 and the angle θx22 is the angle between the visual lines Wb1 and Wb2. This angle can be derived as an angle corresponding to the angle θe in FIG. 12 described above.

The visual line Wb1 in FIG. 15 corresponds to the visual line Fe in FIG. 12, and the visual line Wb2 in FIG. 15 corresponds to the visual line Ff in FIG. 12. Thus, the value of mp in Expression (3) can be calculated as a value indicating a width De1 illustrated in FIG. 12 by substituting the angle θx21 into $\theta_1$ in Expression (3). The value of mp in Expression (3) can be calculated as a value indicating a width De2 illustrated in FIG. 12 by substituting the angle θx22 into $\theta_1$ in Expression (3). Then, the blurring area De can be calculated by subtracting the width De2 from the width De1.

The width De1 is the distance between an end part position of an optical path Ge on the light control pixel 148 side and a reference axis LZ illustrated in FIG. 12 in the X direction. The reference axis LZ illustrated in FIG. 12 is a Z axis passing through the center in the X-direction of a pixel 48 controlled to transmit light. When light from the light control pixel 148 side to the pixel 48 side travels along the visual line Fe as its optical path outside the pixel 48, the optical path Ge is an optical path along which the light travels between the light control pixel 148 and the pixel 48. When light from the light control pixel 148 side to the pixel 48 side travels along the visual line Ff as its optical path outside the pixel 48, an optical path Gf is an optical path along which the light travels between the light control pixel 148 and the pixel 48. The angle difference between the visual line Fe and the optical path Ge relative to the reference axis LZ and the angle difference between the visual line Ff and the optical path Gf relative to the reference axis LZ correspond to the angle difference between the emission angle $\theta_1$ and the traveling angle $\theta_2$ described above with reference to FIG. 5.

The above description with reference to FIG. 15 is made on the method of deriving the blurring area (blurring area De illustrated in FIG. 5) corresponding to a pixel 48 positioned at the second end of the display region OA when the face of the user is located in a direction oblique to the X direction relative to the second end. However, the present disclosure is not limited thereto. An angle to be substituted into $\theta_1$ in Expression (3) described above can be calculated as Qx in Expression (5) by substituting, into Q in Expression (5) described above, the distance (corresponding to, for example, the distance Qa or Qb illustrated in FIG. 15) between another position other than the second end in the display region OA in the X direction and each of the one eye Ea and the other eye Eb in the X direction.

In the description with reference to FIG. 15, an angle formed in the direction from the second end side of the display region OA to the first end side thereof relative to the Z axis is regarded as a positive angle. Thus, the opposite angle, in other words, an angle in the direction from the first end side of the display region OA to the second end side thereof relative to the Z axis may be regarded as a negative angle. Thus, the principle described above with reference to FIGS. 12 and 15 can be also applied to a case in which the angle of a visual line from the one eye Ea to a point in the display region OA relative to the Z axis is a positive angle and the angle of a visual line from the other eye Eb to the point relative to the Z axis is a negative angle. Specifically, in this case, the summed angle of the absolute value of the positive angle and the absolute value of the negative angle corresponds to the angle θe in FIG. 12 described above. In addition, in this case, the blurring area De illustrated in FIG. 12 has a width obtained by adding the absolute value of the positive width De1 and the absolute value of the negative width De2 together. With such a positivity-negativity principle, the blurring area derivation based on the combination of Expressions (3) and (5) is not limited to a case in which the face of the user is located in a direction oblique to the X direction relative to a point in the display region OA, and can be also applied to a case in which the face of the user is located in front of the point as illustrated in FIG. 11.

Specifically, in the case in which the face of the user is located in front of the point as illustrated in FIG. 11, it is possible to perform the blurring area derivation based on the combination of Expressions (3) and (5) by handling the angle between the visual line Fc and the Z axis as a positive angle and handling the angle between the visual line Fd and the Z axis as a negative angle.

The above description is made on blurring areas based on the positions of the face and eyes of the user relative to the display region OA in the X direction, but the same principle is basically applicable also to the positions of the face and eyes of the user relative to the display region OA in the Y direction. However, the positions of the one eye Ea and the other eye Eb in the Y direction are typically the same when the one eye Ea and the other eye Eb are arranged in the X direction. More specifically, when the X direction is the horizontal direction, the Y direction is the vertical direction and the one eye Ea and the other eye Eb of a standing or sitting person are typically arranged in the horizontal direction, and thus the positions of the one eye Ea and the other eye Eb in the vertical direction are the same. In the embodiment, blurring area derivation based on the positions of the face and eyes of the user relative to the display region OA in the Y direction is performed based on such a principle.

Figure 16:
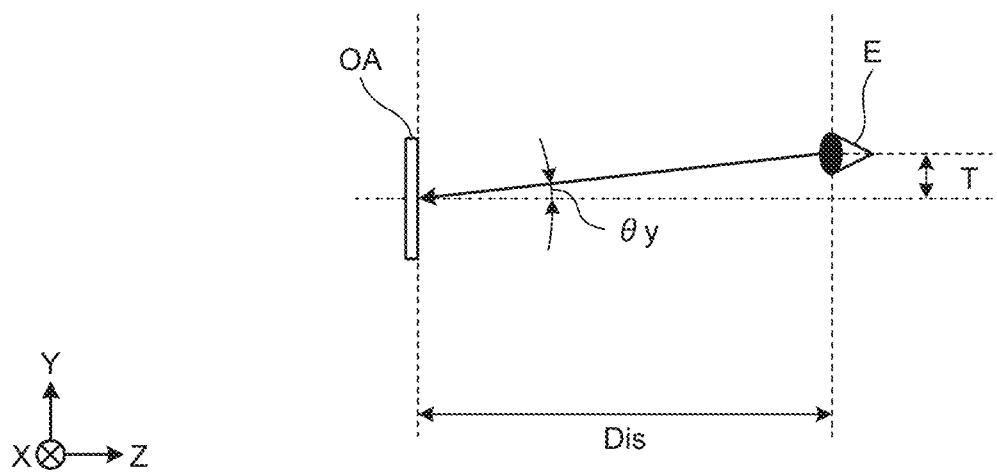
FIG. 16 is a diagram illustrating the principle of blurring area derivation based on the positions of the face and eyes of the user relative to the display region in a Y direction.

FIG. 16 is a diagram illustrating the principle of the blurring area derivation based on the positions of the face and eyes of the user relative to the display region OA in the Y direction. An eye E illustrated in FIG. 16 includes the one eye Ea and the other eye Eb described above. When θy represents the angle in the Y-direction between the Z axis and a straight line connecting the eye E and a point to which the visual line of the eye E points in the display region OA, θy can be expressed by Expression (6) below. In Expression (6), T represents the distance between the eye and the point in the display region OA in the Y direction. The value of mp in Expression (3) can be calculated as the central position of a blurring area in the Y direction by substituting θy calculated by Expression (6) into $θ_1$ in Expression (3) described above.

$$θy = a\tan[T/Dis] \quad (6)$$

The blurring area in the Y direction may be a fixed value irrespective of the size of θy described above or may be individually determined in accordance with the size of θy described above in advance. For example, the blurring area may be limited to light control pixels 148 arranged in the X direction at a position in the Y-direction corresponding to the central position of the blurring area in the Y direction, which is indicated by the value of mp calculated by the combination of Expressions (6) and (3). In other words, in deriving the blurring area in the Y direction, the value mp may be limited to use as information for deriving the position in the Y-direction of the light control pixel 148 for forming a blurring area for the pixel 48 in accordance with a pixel 48 controlled to transmit light, and may be not intended to be used to form a light transmission area including a plurality of light control pixels 148 in the Y direction.

The above description is made on the derivation of the blurring area by calculation based on an assumption that the angle of the eye E relative to a point in the display region OA is known. The embodiment includes means for acquiring the angle of the eye E relative to a point in the display region OA. Specifically, in the embodiment, the image capturer 90 acquires information related to the positions of the eyes of the user relative to the display region OA. In the following, the mechanism of acquisition of information related to the positions of the eyes of the user relative to the display panel 30 by the image capturer 90 will be described with reference to FIGS. 17 and 18.

Figure 17:
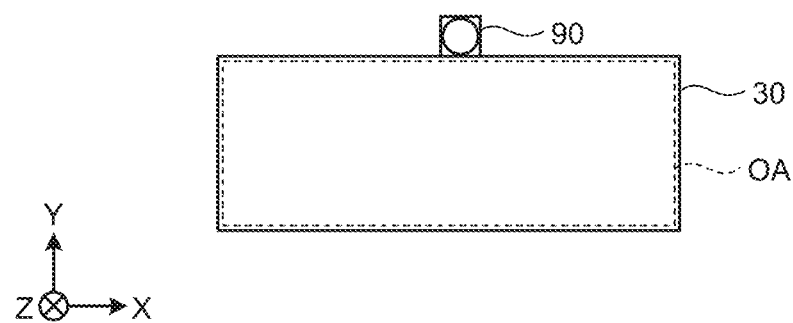
FIG. 17 is a schematic diagram illustrating exemplary arrangement of the display panel and an image capturer.

FIG. 17 is a schematic diagram illustrating exemplary arrangement of the display panel 30 and the image capturer 90. The image capturer 90 captures an image with the angle of view in the facing direction of the display panel 30. Specifically, the image capturer 90 is what is called a digital camera. More specifically, the image capturer 90 includes an image-capturing element such as a complementary metal oxide semiconductor (CMOS) image sensor, and a lens through which light is collected onto the image-capturing element. The image capturer 90 generates image data by operating the image-capturing element. As illustrated in FIG. 17, the lens of the image capturer 90 is pointed to the face of the user facing the display panel 30 in the Z direction so as to enable image capturing of the face of the user.

The image capturer 90 is positioned outside the display panel 30 as schematically illustrated in FIG. 17. Specifically, it is difficult to position the image capturer 90 at the center of the display panel 30 in the X and Y directions. In FIG. 17, the image capturer 90 is positioned at the center of the display panel 30 in the X direction but not positioned at the center thereof in the Y direction. Thus, it is preferable to perform correction in accordance with such positional deviation between the image capturer 90 and the display panel 30. The correction may be performed by a well-known method and does not necessarily need to be specially noted in the present disclosure, and thus detailed description thereof is omitted.

Figure 18:
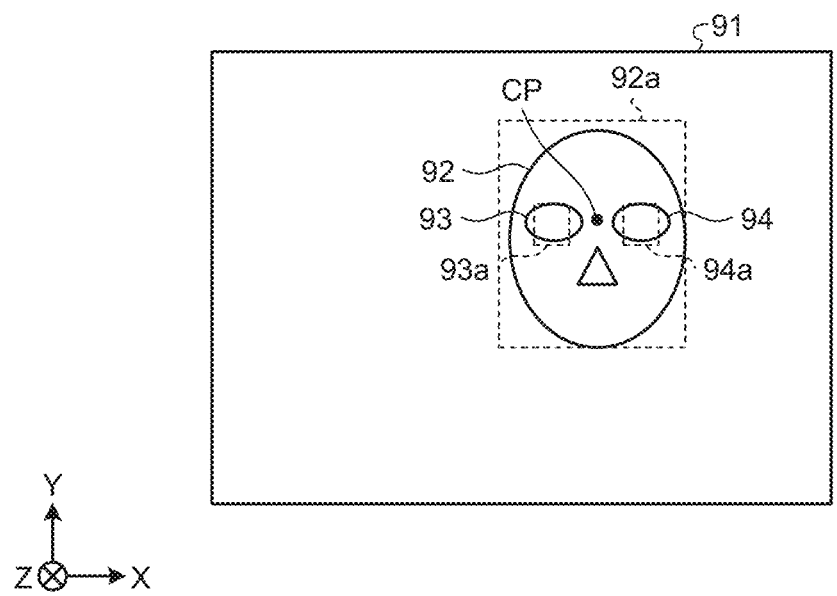
FIG. 18 is a schematic diagram illustrating the mechanism of recognition processing of a user's face captured in an image capturing area by the image capturer.

FIG. 18 is a schematic diagram illustrating the mechanism of recognition processing of a user's face captured in an image capturing area 91 of the image capturer 90. The blurring processing calculator 12 identifies a face image 92 of the user included in the image capturing area 91 of the image capturer 90 by using an image recognition technology such as pattern matching. The blurring processing calculator 12 also recognizes a right-eye image 93 and a left-eye image 94 in the face image 92. The blurring processing calculator 12 may recognize the user's face, the right eye, and the left eye in the units of rectangular areas, like a face image area 92a, a right-eye area 93a, and a left-eye area 94a illustrated with dashed lines, instead of recognizing the edges of the shapes of the face image 92, the right-eye image 93, and the left-eye image 94. Alternatively, such processing may be performed that determines the position of the middle point CP on a central line of the face image 92 and handles the right-eye image 93 and the left-eye image 94 (or the right-eye area 93a and the left-eye area 94a) as images assumed to be located at positions facing to each other in the X direction with the middle point CP interposed therebetween in the face image 92 (or the face image area 92a). In this case, each of the position (distance) of the center of the right-eye image 93 (or the center of the right-eye area 93a) from the middle point CP and the position (distance) of the center of the left-eye image 94 (or the center of the left-eye area 94a) from the middle point CP is a fixed value (for example, 3.6 cm).

Based on the positions of the right-eye image 93 and the left-eye image 94 (or the right-eye area 93a and the left-eye area 94a) recognized in an image captured by the image capturer 90, the blurring processing calculator 12 identifies the angle in the X direction (for example, the above-described angle θx21) of a visual line from the right-eye image 93 (or the right-eye area 93a) to each pixel 48 of the display panel 30 disposed in the display region OA relative to the Z axis, the angle in the X direction (for example, the above-described angle θx22) of a visual line from the left-eye image 94 (or the left-eye area 94a) to each pixel 48 of the display panel 30 disposed in the display region OA relative to the Z axis, and the angle in the Y direction thereof (for example, θy described above) relative to the Z axis.

Information such as the distance Qa, the distance Qb, and the distance T described above for calculating the angles of a visual line relative to the Z axis in the X and Y directions can be derived from dimension data measured in advance. Specifically, the blurring processing calculator 12 can identify the distance in the X direction (for example, the above-described distance Qa or Qb) between the position of each pixel 48 and each of the position of the one eye Ea (right-eye image 93) and the position of the other eye Eb (left-eye image 94) and the distance in the Y direction (for example, the above-described distance T) therebetween based on the dimension data in accordance with where the right-eye image 93 and the left-eye image 94 (or the right-eye area 93a and the left-eye area 94a) are located in the image capturing area 91. The dimension data is stored in advance in a storage region (for example, a flash memory in the signal processor 10) that is readable by the blurring processing calculator 12. Based on the image captured by the image capturer 90, Expressions (5) and (6), and the dimension data, the blurring processing calculator 12 specifies the angles in the X direction (for example, the above-described angles θx21 and θx22) of the visual lines from the right-eye image 93 and the left-eye image 94 (or the right-eye area 93a and the left-eye area 94a) to each pixel 48 of the display panel 30 disposed in the display region OA relative to the Z axis and the angles in the Y direction (for example, θy described above) thereof relative to the Z axis.

In the embodiment, the distance Dis is a fixed value. Specifically, it is possible to perform operation using the distance Dis as a fixed value when, for example, the display device 1 is provided in an automobile, a seat on which a user can be seated is provided at a position facing the display device 1, and the distance Dis between the user sitting on the seat and the display device 1 is allowed to be handled as a fixed value.

The angles in the X direction of the visual lines from the right-eye image 93 and the left-eye image 94 (or the right-eye area 93a and the left-eye area 94a) to each pixel 48 relative to the Z axis and the angles in the Y direction thereof relative to the Z axis in accordance with where the right-eye image 93 and the left-eye image 94 (or the right-eye area 93a and the left-eye area 94a) are located in the image capturing area 91, may be recorded in advance in angle data measured in advance in place of the above-described dimension data. When the angle data is employed, the angle data is stored in advance in a storage region that is readable by the blurring processing calculator 12. The blurring processing calculator 12 acquires a captured image generated by the image capturer 90, identifies the positions of the right-eye image 93 and the left-eye image 94 (or the right-eye area 93a and the left-eye area 94a), and identifies the angles in the X direction of the visual lines from the right-eye image 93 and the left-eye image 94 (or the right-eye area 93a and the left-eye area 94a) to each pixel 48 relative to the Z axis and the angles in the Y direction thereof relative to the Z axis by referring to the angle data.

When the positions of the face image 92 (or the face image area 92a) and the middle point CP are identified in place of the right-eye image 93 and the left-eye image 94 (or the right-eye area 93a and the left-eye area 94a), the blurring processing calculator 12 determines the position of the right-eye image 93 to be one of two places separated from the middle point CP by a fixed value in the X direction and determines the position of the left-eye image 94 to be the other place. Except for this, the same description is applied to the method of identifying the angles in the X direction of the visual lines from the right-eye image 93 and the left-eye image 94 (or the right-eye area 93a and the left-eye area 94a) to each pixel 48 relative to the Z axis and the angles in the Y direction thereof relative to the Z axis.

Figure 19:
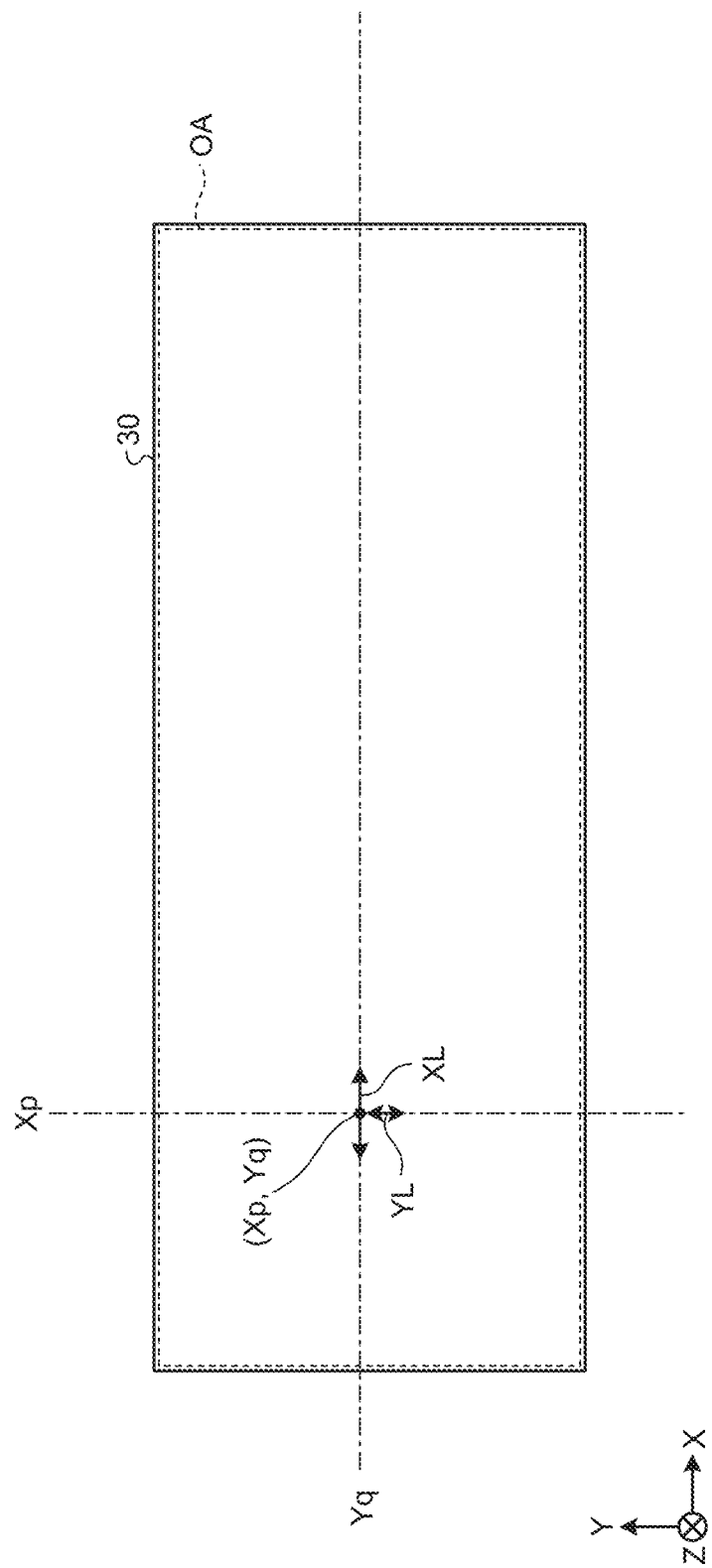
FIG. 19 is a schematic diagram illustrating an exemplary blurring area derived in accordance with the positions of the eyes of the user relative to the display panel.

FIG. 19 is a schematic diagram illustrating an exemplary blurring area derived in accordance with the positions of the eyes of the user relative to the display panel 30. When the angles in the X direction of the visual lines from the right-eye image 93 and the left-eye image 94 (or the right-eye area 93a and the left-eye area 94a) to each pixel 48 relative to the Z axis and the angles in the Y direction thereof relative to the Z axis are identified, the blurring processing calculator 12 can calculate the blurring area mp based on Expression (3) described above. Thus, the blurring area mp applied to a light control pixel 148 that transmits light incident on a pixel 48 controlled to transmit light in accordance with the input signal IP among the pixels 48 can be individually derived.

FIG. 19 schematically illustrates a width XL in the X-direction and a width YL in the Y-direction of a blurring area applied to a light control pixel 148 that transmits light incident on a pixel 48 located at coordinates (Xp, Yq) in the display region OA. The coordinates (Xp, Yq) is the combination of a coordinate Xp in the X-direction and a coordinate Yq in the Y-direction in the display region OA of the display panel 30. The blurring processing calculator 12 individually derives a blurring area mp applied to a light control pixel 148 that transmits light incident on a pixel 48 controlled to transmit light in accordance with the input signal IP among the pixels 48.

The blurring processing calculator 12 may employ the scheme of identifying a pixel 48 controlled to transmit light in accordance with the input signal IP among the pixels 48 based on the input signal IP, calculating the angles in the X direction of the visual lines from the right-eye image 93 and the left-eye image 94 (or the right-eye area 93a and the left-eye area 94a) to the identified pixel 48 relative to the Z axis and the angles in the Y direction thereof relative to the Z axis, and deriving the blurring area mp applied to a light control pixel 148 that transmits light incident on the identified pixel 48. The scheme is employed in the process of processing described below with reference to FIG. 20.

Figure 20:
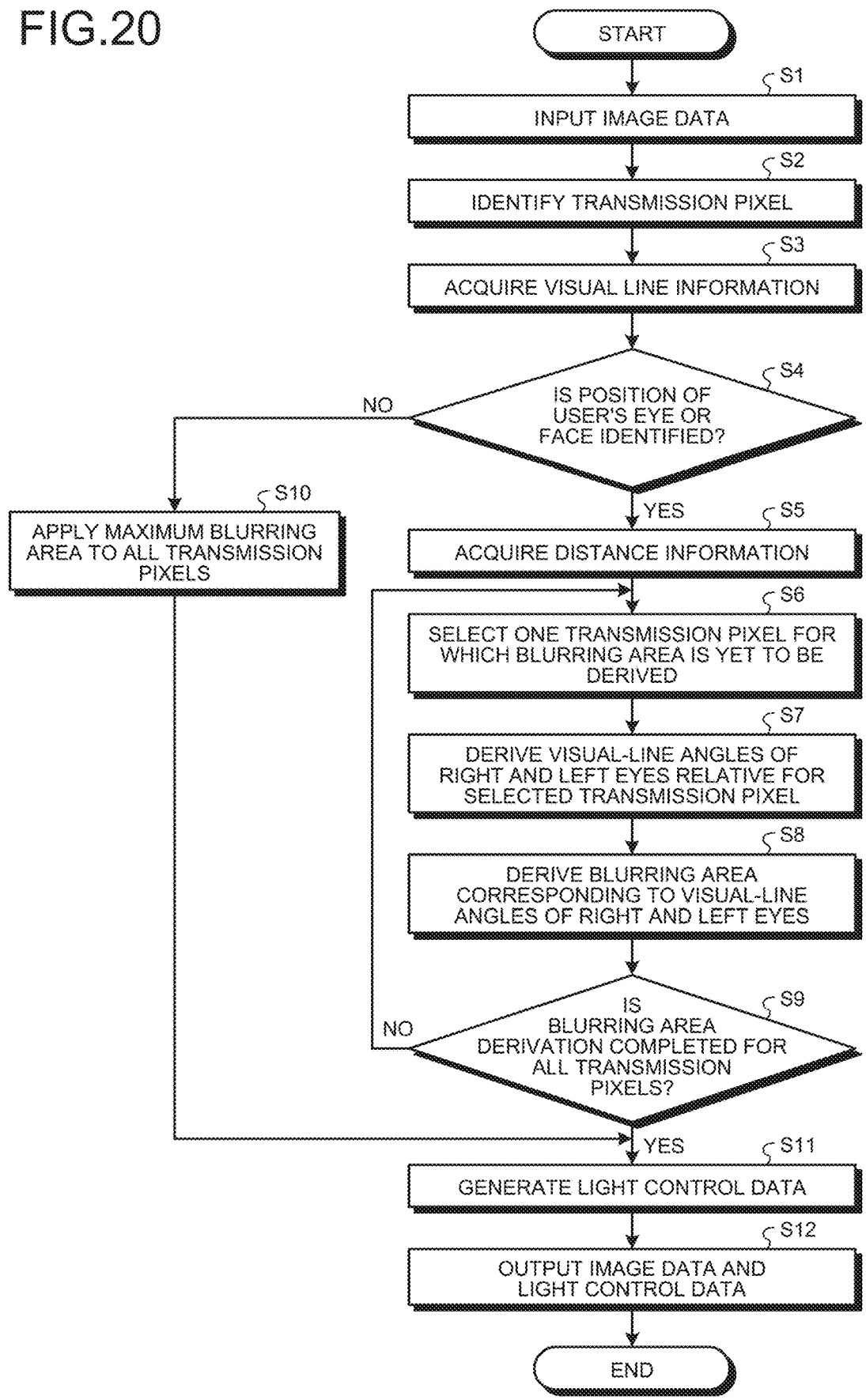
FIG. 20 is a flowchart illustrating an exemplary process of processing of applying the blurring area and performing display output.

FIG. 20 is a flowchart illustrating an exemplary process of processing of applying a blurring area and performing display output. When the input signal IP is input (step S1), the blurring processing calculator 12 identifies a transmission pixel (step S2). Specifically, in the processing at step S2, the blurring processing calculator 12 identifies a pixel 48 to be controlled to transmit light in accordance with the input signal IP among the pixels 48 based on the input signal IP. Hereinafter, a transmission pixel means a pixel 48 to be controlled to transmit light in accordance with the input signal IP.

The blurring processing calculator 12 acquires visual line information (step S3). Specifically, image capturing is performed by the image capturer 90. The blurring processing calculator 12 identifies the right-eye image 93 and the left-eye image 94 (or the right-eye area 93a and the left-eye area 94a; or the face image 92 or the face image area 92a and the middle point CP) of a user included in an image captured by the image capturer 90.

The blurring processing calculator 12 determines whether the right-eye image 93 and the left-eye image 94 (or the right-eye area 93a and the left-eye area 94a) of the user, or the face image 92 (or the face image area 92a) of the user and the middle point CP are identified in the processing at step S3 (step S4). When the right-eye image 93 and the left-eye image 94 (or the right-eye area 93a and the left-eye area 94a) of the user, or the face image 92 (or the face image area 92a) of the user and the middle point CP are identified in the processing at step S3 (Yes at step S4), the blurring processing calculator 12 acquires distance information (step S5). In the embodiment, the distance information is the distance Dis that is a fixed value as described above.

The blurring processing calculator 12 selects one transmission pixel for which the blurring area mp is yet to be derived among the transmission pixels identified in the processing at step S2 (step S6). The blurring processing calculator 12 derives the visual-line angle (for example, the above-described angle θx21) of the one eye Ea and the visual-line angle (for example, the above-described angle θx22) of the left eye relative to the transmission pixel selected in the processing at step S6 (step S7). In the processing at step S7, their visual-line angles (for example, θy described above) in the Y direction are derived as well.

The blurring processing calculator 12 derives the blurring area corresponding to the visual-line angles derived in the processing at step S7 (step S8). In the processing at steps S7 and S8, for example, Expressions (3), (5), and (6) described above and data (dimension data or angle data) that can be referred by the blurring processing calculator 12 are used.

The blurring processing calculator 12 determines whether the blurring area derivation is completed for all transmission pixels identified in the processing at step S2 (step S9). When there is a transmission pixel for which the blurring area is yet to be identified (No at step S9), the process goes back to the processing at step S6.

When the blurring area derivation is completed for all transmission pixels (Yes at step S9), the blurring processing calculator 12 generates light control data (step S11). The light control data is data in which the blurring areas for the respective transmission pixels are integrated. Specifically, at drawing of frame image data that is output from the display panel 30 in response to inputting of the output image signal OP in accordance with the input signal IP, the blurring area corresponding to the frame image data is applied when the light control data is applied to the light control panel 80. The blurring processing calculator 12 outputs the output image signal OP to the display panel 30 and outputs the light control data to the light control panel 80 (step S12).

At step S4, when the right-eye image 93 and the left-eye image 94 (or the right-eye area 93a and the left-eye area 94a) of the user, or the face image 92 (or the face image area 92a) of the user and the middle point CP cannot be identified in the processing at step S3 (No at step S4), the blurring processing calculator 12 applies the maximum blurring area to all transmission pixels (step S10). The maximum blurring area is, for example, the blurring area described above with reference to FIG. 10 or the above-described blurring area with reference to FIG. 13. The processing at step S10 is performed when neither of the right-eye image 93 and the left-eye image 94 (or the right-eye area 93a and the left-eye area 94a) nor the face image 92 (or the face image area 92a) and the middle point CP can be identified because, for example, the face of the user is not included in the image captured by the image capturer 90 for some reason.

In the above description, it is assumed that the distance information at step S5, in other words, the distance Dis, is a fixed value. However, the distance Dis may be variable.

Figure 21:
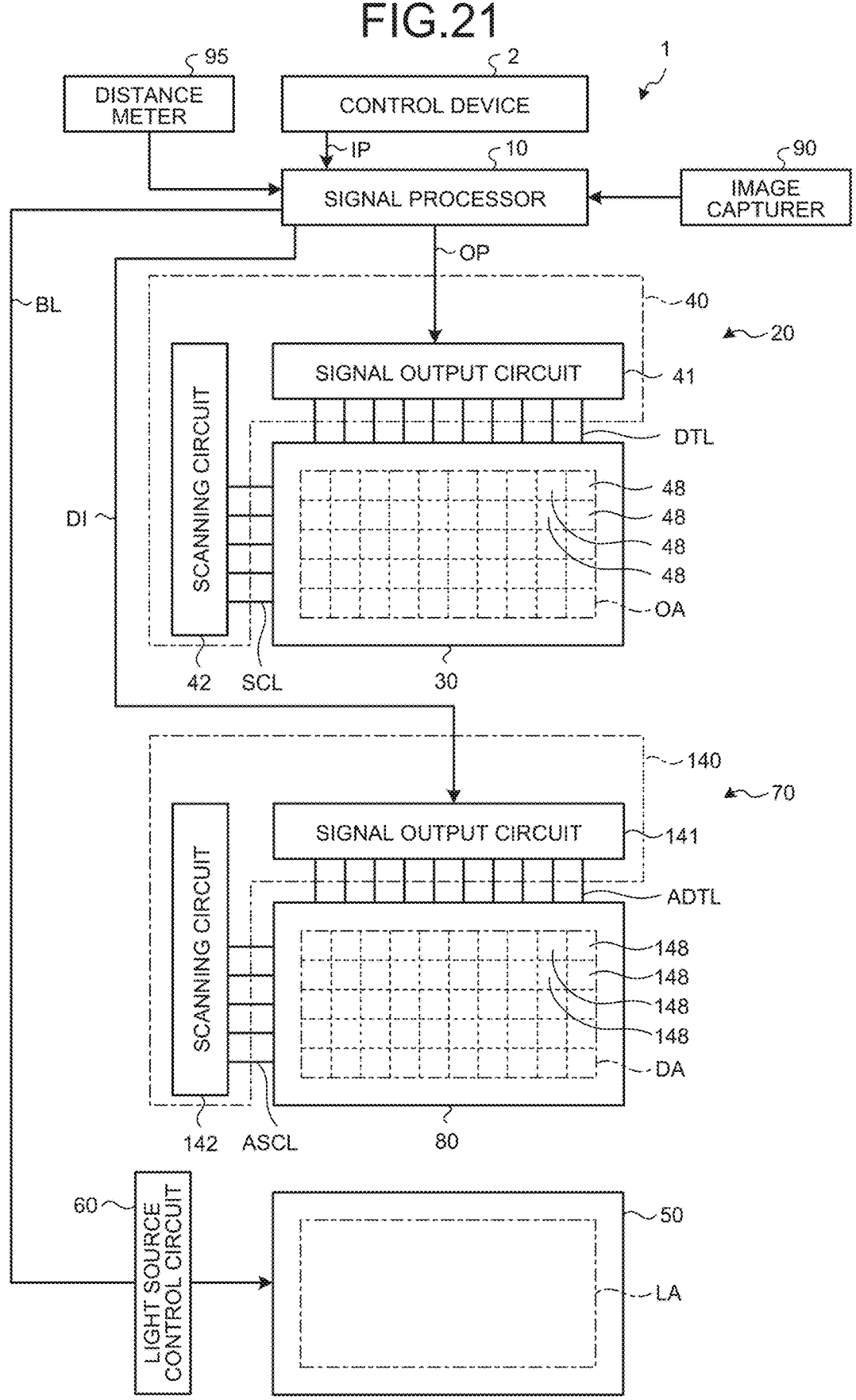
FIG. 21 is a diagram illustrating a display device 1 in which a distance meter is provided in addition to the configuration illustrated in FIG. 1.

FIG. 21 is a diagram illustrating the display device 1 in which a distance meter 95 is provided in addition to the configuration illustrated in FIG. 1. The distance meter 95 acquires information on the distance Dis. Specifically, the distance meter 95 has functions of a distance meter that measures the distance between the eye E or face (for example, the position of the middle point CP in the face of the user) of the user and the display panel 30. The distance meter function of the distance meter 95 may be achieved, for example, by what is called an ultrasonic wave method of measuring the distance to the user by measuring the time from when an ultrasonic wave is emitted to when its reflected wave returns, by a contrast method (image focusing method) used by a digital camera, or by any other method. When the distance meter 95 is provided, the blurring processing calculator 12 acquires, from the distance meter 95, output information indicating the distance between the user and the display panel 30. The blurring processing calculator 12 updates the distance Dis in accordance with the output information. The other processing is the same as described above.

As described above, according to the embodiment, the display device 1 includes a first panel (the light control panel 80), a second panel (the display panel 30) disposed opposing one surface of the first panel, a light source (the light source device 50) configured to emit light to the other surface of the first panel, and an acquirer (for example, the image capturer 90) configured to acquire user information including information indicating at least one of the position of an eye and the position of the head of a person located on one surface side of the second panel and facing the second panel. The first panel includes a plurality of light control pixels (light control pixels 148). The second panel includes a plurality of pixels (pixels 48). In the display device 1, blurring processing is applied by which the light control pixels positioned around a pixel controlled to transmit light in accordance with an input image signal (the input signal IP) are caused to transmit light. A blurring area including the light control pixels to which the blurring processing is applied on the first panel corresponds to the position of the eye or head of the person.

According to the embodiment, user information including information indicating the position of the eye or the position of the head of the person located on the one surface side of the second panel (display panel 30) and facing the second panel is acquired. With this configuration, information related to a position at which the user visually recognizes an image output from the display device 1 can be acquired based on the user information. Thus, an image to which the blurring processing is applied in a blurring area in accordance with the position at which the user visually recognizes the image can be output. In other words, it is possible to perform more various adjustments depending on the position of image visual recognition by the user. Moreover, with the blurring processing applied to the first panel (light control panel 80) facing the second panel, it is possible to hamper occurrence of display quality degradation such as a double image and a partially missing image described above while further increasing image contrast. In this manner, according to the embodiment, it is possible to perform various adjustment depending on the position of image visual recognition by the user and increase image contrast.

The blurring area also corresponds to the angle between a first straight line (for example, the above-described visual line Wb1 or Wb2) and a second straight line (the Z axis). The first straight line connects the pixel controlled to transmit light and at least one of the eye (for example, the one eye Ea)

of the person and a predetermined position (for example, the middle point CP) in the face of the person, and the second straight line is orthogonal to a plate surface of the second panel (display panel 30). Accordingly, it is possible to more reliably apply the blurring area to a position at which the person visually recognizes an image output from the display device 1.

The above-described user information includes information indicating the distance (distance Dis) between the second panel (display panel 30) and the eye or face of the person. When the user information includes the information indicating the distance, the acquirer has a configuration with which the acquirer can measure distance like the above-described distance meter 95. The blurring area also corresponds to the information indicating the distance. Accordingly, it is possible to more reliably apply the blurring area to a position at which the person visually recognizes an image output from the display device 1.

The blurring area is derived based on the distance (distance Dis) between the second panel (display panel 30) and the eye or face of the person as a fixed distance. With this, it is possible to apply the blurring area to a position at which the person visually recognizes an image output from the display device 1 without a configuration that can measure distances like the above-described distance meter 95.

The blurring area is a predetermined area when neither the position of the eye of the person nor the position of the head of the person can be acquired. The predetermined area is larger than the blurring area corresponding to the positions of the eye of the person or the position of the head of the person. Accordingly, it is possible, by applying the blurring processing to the first panel (light control panel 80), to improve image contrast irrespective of the position of the eye of the person or the position of the head of the person.

The acquirer (image capturer 90) includes an image-capturing element configured to capture an image of the one surface side of the second panel (display panel 30). Accordingly, it is possible to acquire, based on the image captured by the image-capturing element, information indicating at least one of the position of the eye and the position of the head of the person facing the second panel side.

A signal to be reflected on an output of the first panel (light control panel 80) is a signal obtained by performing gamma correction on the image signal (input signal IP) in accordance with a predetermined gamma value. Accordingly, it is possible to more appropriately control the degree of light transmission of light control pixels (light control pixels 148) based on the gamma value.

A signal to be reflected on an output of the second panel (display panel 30) is a signal obtained by performing gamma correction on the image signal (input signal IP) in accordance with the gamma value of the second panel. Accordingly, it is possible to more appropriately perform display output in accordance with gamma characteristics of the second panel.

The first panel is a monochrome liquid crystal panel. Accordingly, it is easier to increase light transmittance of the second panel.

When the blurring area is too large in outputting of an image including a high luminance region surrounded by a dark color such as black, halo (chromatic aberration and light aberration) potentially occurs. In the embodiment, since the blurring area is set so as to correspond to at least one of the position of the eye of the person and the position of the head of the person as described above, it is possible to reduce the occurrence of such halo, thereby achieving higher display quality.

The effect of high contrast achieved when the blurring area corresponds to at least one of the position of the eye of the person and the position of the head of the person as described above is obtained irrespective of the image signal (input signal IP). Especially, when an overall bright image (an image with a bright background) is displayed, a significant effect can be obtained.

Since a transmission pixel is identified at the processing at step S2 as described above, the blurring area can be derived for not the positions of all pixels 48 but the transmission pixel only. Accordingly, it is possible to reduce a processing load required for the processing by the blurring processing calculator 12. Thus, it is possible to reduce the circuit scale of the signal processor 10.

The blurring area can be decreased by making the blurring area correspond to at least one of the position of the eye of the person and the position of the head of the person. Thus, even when the interval (d) between the pixels 48 and the light control pixels 148 in the Z direction is larger, the degree of increase of the blurring area along with increase of the interval (d) is smaller than that in a case in which the blurring area is larger. Thus, even when reduction of the interval (d) is restricted for some reason, it is easier to restrain the blurring area from being too large. Accordingly, a level of request for reduction in thickness of a multilayered structure of the display panel 30 and the light control panel 80 included in the display device 1 is lowered, thereby making it easier to relax designing restrictions.

The following numerically describes an example of effects obtained by making the blurring area correspond to at least one of the position of the eye of the person and the position of the head of the person. In the example, the panel width PD is 30 cm, the distance Dis is 50 cm, the maximum movable area Dmax is 80 cm, the interval (d) between the pixels 48 and the light control pixels 148 in the Z direction is 1.5 mm, the refractive index ($n_2$) of the multilayered structure between the light control pixels 148 and the pixels 48 is 1.4, the density of the pixels 48 of the display panel 30 and the density of the light control pixels 148 of the light control panel 80 are 200 pixels per inch (ppi). In this case, as in the above-described processing at step S10, for example, with the blurring area applied when the position of the eye of the person and the position of the head of the person are unknown, the number of light control pixels 148 that are continuously arranged in the X direction and controlled to transmit light by the blurring processing on one pixel 48 controlled to transmit light is larger than eleven. By contrast, with the blurring area applied when at least one of the position of the eye of the person and the position of the head of the person is known, the number of light control pixels 148 that are arranged in the X direction and controlled to transmit light by the blurring processing on one pixel 48 controlled to transmit light is one at minimum. One light control unit that is indivisually controlled may be composed of one light control pixel 148. That is, with one light control pixel 148, it is possible to achieve contrast increase by the light control panel 80 while reducing a double image and a partially missing image described above, and it is further possible to reduce the probability of occurrence of the above-described halo.

The signal processor 10 may be provided as one circuit or the functions of the signal processor 10 may be achieved by a combination of a plurality of circuits.

Derivation of the visual-line angle ($\theta y$ described above) in the Y direction may be omitted. As described above, one light control unit that is indivisually controlled may be composed of one light control pixel 148. In this case, a light control pixel 148 that transmits light to be transmitted through a transmission pixel is a light control pixel 148 that has the same position in the Y-direction as the transmission pixel in plan view.

In the above description, the image capturer 90 functions as an acquirer configured to acquire position information on the eyes or head of a person facing the display panel 30, but the acquirer is not limited to the image capturer 90. For example, when the above-described distance meter 95 employs the ultrasonic wave method or the contrast method, the distance meter 95 may have the function of acquiring position information on the eyes or head of a person facing the display panel 30. The acquirer may employ another configuration with which the face and eyes of a person can be identified like an infrared camera, for example. The positions of the eyes or head of a person, which is acquired by the acquirer, may be information indicating a predetermined position. In other words, control may be performed based on an assumption that the position of the eyes or head of a person facing the display panel 30 does not move.

It is not essential that part of the configuration of the display device 1, such as the image capturer 90 or the distance meter 95 that functions as the acquirer, is dedicated to the display device 1. For example, when the display device 1 is provided in a device or facility provided with a component that functions as the acquirer, the component that is provided in the device or facility and functions as the acquirer may be used.

It should be understood that the present disclosure provides any other effects achieved by aspects described above in the embodiment, such as effects that are clear from the description of the present specification or effects that could be thought of by the skilled person in the art as appropriate.

What is claimed is:

1. A display device comprising:
   a first panel;
   a second panel disposed opposing one surface of the first panel;
   a light source configured to emit light to the other surface of the first panel; and
   an acquirer configured to acquire user information including information indicating at least one of a position of an eye and a position of a head of a user located on one surface side of the second panel and facing the second panel, wherein
   the first panel includes a plurality of light control pixels,
   the second panel includes a plurality of pixels,
   blurring processing is applied by which the light control pixel positioned around a pixel controlled to transmit light in accordance with an input image signal is caused to transmit light,
   a blurring area including the light control pixel to which the blurring processing is applied on the first panel corresponds to the position of the eye of the user or the position of the head of the user,
   when the position of the eye of the user relative to the second panel is unavailable, the blurring area is a predetermined area that is determined in advance so that the blurring processing is applied irrespective of a line of sight of the user to the second panel, and
   when the position of the eye of the user relative to the second panel is available, the blurring area is smaller than the predetermined area and corresponds to the position of the eye of the user.

2. The display device according to claim 1, wherein the blurring area also corresponds to an angle between a first straight line and a second straight line,
   the first straight line connects the pixel controlled to transmit light and at least one of the position of the eye of the user and a predetermined position in the face of the user, and
   the second straight line is orthogonal to a plate surface of the second panel.

3. The display device according to claim 1, wherein
   the user information includes information indicating the distance from the second panel to the eye of the user or the face of the user, and
   the blurring area also corresponds to the information indicating the distance.

4. The display device according to claim 1, wherein the blurring area is derived based on a distance from the second panel to the eye of the user or the face of the user as a fixed distance.

5. The display device according to claim 1, wherein the acquirer includes an image-capturing element configured to capture an image of the one surface side of the second panel.

6. A display device comprising:
   a first panel;
   a second panel disposed opposing one surface of the first panel;
   a light source configured to emit light to the other surface of the first panel; and
   an acquirer configured to acquire user information including information indicating at least one of a position of an eye and a position of a head of a user located on one surface side of the second panel and facing the second panel,
   wherein
   the first panel includes a plurality of light control pixels,
   the second panel includes a plurality of pixels,
   blurring processing is applied by which the light control pixel positioned around a pixel controlled to transmit light in accordance with an input image signal is caused to transmit light,
   a blurring area including the light control pixel to which the blurring processing is applied on the first panel corresponds to the position of the eye of the user or the position of the head of the user,
   a signal to be reflected on an output of the first panel is a signal obtained by performing gamma correction on the image signal in accordance with a predetermined gamma value.

7. A display device comprising:
   a first panel;
   a second panel disposed opposing one surface of the first panel;
   a light source configured to emit light to the other surface of the first panel; and
   an acquirer configured to acquire user information including information indicating at least one of a position of an eye and a position of a head of a user located on one surface side of the second panel and facing the second panel,
   wherein
   the first panel includes a plurality of light control pixels,
   the second panel includes a plurality of pixels,
   blurring processing is applied by which the light control pixel positioned around a pixel controlled to transmit light in accordance with an input image signal is caused to transmit light,
   a blurring area including the light control pixel to which the blurring processing is applied on the first panel corresponds to the position of the eye of the user or the position of the head of the user, a signal to be reflected on an output of the second panel is a signal obtained by performing gamma correction on the image signal in accordance with a gamma value of the second panel.

8. The display device according to claim 1, wherein the first panel is a monochrome liquid crystal panel.

9. The display device according to claim 1, wherein the blurring area including the light control pixel to which the blurring processing is applied on the first panel is changed when the position of the eye of the user relative to the second panel is changed.

10. The display device according to claim 1, wherein
when a right-eye image and a left-eye image of the user, or a face image of the user are identified, distance information is acquired,
one light control pixel for which the blurring area is yet to be derived among the light control pixels is selected,
visual-line angles of right and left eyes relative to the selected light control pixel are derived, and
the blurring area corresponding to the visual-line angles of right and left eyes is derived.

* * * * *